United States Patent
Andrew

Patent Number: 6,163,626
Date of Patent: Dec. 19, 2000

[54] METHOD FOR DIGITAL IMAGE COMPRESSION

[75] Inventor: James Philip Andrew, Waverton, Australia

[73] Assignee: Canon Kabushiki Kaisha, Tokyo, Japan

[21] Appl. No.: 09/012,012

[22] Filed: Jan. 22, 1998

[30] Foreign Application Priority Data

Jan. 22, 1997 [AU] Australia ............................. PO 4728

[51] Int. Cl.[7] .............................. G06K 9/36; G06K 9/46
[52] U.S. Cl. .......................... 382/240; 382/233; 382/248
[58] Field of Search .................................. 382/239, 240, 382/247, 248, 233, 244, 249, 250; 358/426; 348/422, 384; 364/715.02; 341/79

[56] References Cited

U.S. PATENT DOCUMENTS

| | | | |
|---|---|---|---|
| 5,321,776 | 6/1994 | Shapiro | 382/240 |
| 5,748,116 | 5/1998 | Chui et al. | 341/50 |
| 5,881,176 | 3/1999 | Keith et al. | 382/248 |

OTHER PUBLICATIONS

J.M. Shapiro, "Embedded Image Coding Using Zerotrees Of Wavelet Coefficients", IEEE Transations On Signal Processing, vol. 41, No. 12, Dec. 1993, pp. 3445–3462.

A. Said, et al., "A New Fast And Efficient Image Codec Based On Set Partitioning In Hierarchical Trees", Manuscript submitted to the IEEE Transactions on Circuits and Systems for Video Technology, May 1993.

Cai et al., "Wavelet Transform And Bit–Plane Encoding", Proc.Int.Conf. Image Processing, Oct. 23, 1995, vol. 1, pp. 578–581.

Macq et al., "Very low bit–rate image coding on adaptive multigrids", Signal Processing, Immage Comm., vol. 7, No. 4/06, Nov. 1, 1995, pp 313–331.

Shusterman et al., "Image Compression Via Improved Quadtree Decompostition Algorithms", IEEE Trans. Image Processing, vol. 3, No. 2, Mar. 1, 1994, pp. 207–215.

*Primary Examiner*—Bhavesh Mehta
*Attorney, Agent, or Firm*—Fitzpatrick, Cella, Harper & Scinto

[57] ABSTRACT

Methods, apparatus and computer program products for encoding and decoding transform coefficients are disclosed. A digital image (102) is input to a transform block (110), which preferably employs a discrete wavelet transform. A bit rearrangement block (120) codes bit sequences representing resulting transform coefficients (112) in an efficient fashion. The bit arrangement block (120) selects a portion of the coefficients as a region (200). The significance of each bitplane of the region (200) is scanned from most towards least significant bitplanes, and first and second tokens are provided for each insignificant and significant bitplanes until determining a significant bitplane. This region is then partitioned into subregions (210–216), which are each set as the selected region. This processing is repeated until a minimum bit level is reached, or the selected region has a specified size. The coefficients of specified-size regions (200–216) are coded and provided in a coded representation (122).

108 Claims, 12 Drawing Sheets

METHOD FOR DIGITAL IMAGE COMPRESSION

The present invention relates to a method and apparatus for representing digital image data, and in particular to a method and apparatus for encoding and decoding transform coefficients obtained from digital image data.

BACKGROUND

A number of transform-based image coding techniques are known which involve linear transforming a source image to decorrelate data and then encoding the transform coefficients. Such conventional techniques include the JPEG standard image compression method, which employs an 8×8 block discrete cosine transform (DCT). JPEG encoding involves transforming blocks of a source image using the DCT, quantising the resultant transform coefficients where most of the compression is effected, and lossless encoding the quantised coefficients in a predefined zig-zag sequence from lowest frequency coefficients to highest frequency coefficients.

There is also a compression technique termed the embedded zerotree wavelet (EZW) method. EZW involves applying a discrete wavelet transform to a source image to decompose the image into a number of high frequency subbands and a lowest frequency subband, normally at a number of different resolution levels or scales. Zero tree encoding is then applied to the subbands dependent upon predictions of the self-similarity of coefficients across scales. The zero-tree-encoded coefficients are then lossless encoded using arithmetic coding.

However, both techniques utilise relatively complex methods for encoding position information and employ lossless encoding. Thus, the foregoing methods have a number of disadvantages including lack of flexibility and complexity in the coding technique.

SUMMARY

In accordance with a first aspect of the invention, there is provided a method of representing a digital image to provide a coded representation, the method including the steps of:
  transforming the digital image to derive a plurality of coefficients, each coefficient represented by a predefined bit sequence;
  selecting a portion of the plurality of coefficients as a region;
  (a) scanning the significance of each bitplane of the selected region from a most significant bitplane towards a least significant bitplane and providing a first token in the coded representation for each insignificant bitplane until a significant bitplane is determined, wherein a second token is provided in the coded representation for the significant bitplane;
  (b) partitioning the selected region into two or more subregions having a predetermined form, and setting each of the subregions as the selected region;
  (c) repeating steps (a) and (b) commencing from the significant bitplane until a predetermined minimum bit level has been reached, or the selected region has a predetermined size wherein the coefficients of the selected region are coded and provided in the coded representation.

Preferably, the linear transforming step includes applying a discrete wavelet transform to the digital image, and the selected portion of the coefficients initially includes the entire plurality of coefficients, or a subband of the coefficients.

Preferably, the first and second tokens include bit values of 0 and 1, respectively.

Preferably, the subregions are equally sized, and optionally are square.

Preferably, the predetermined size of the subregion is less than or equal to 2×2 coefficients, and may more preferably be a 1×1 coefficient. Still further, the predetermined size coefficient(s) is (are) encoded by outputting bits of the corresponding bit sequence beginning with the respective significant bitplane. Preferably, only bits of the corresponding bit sequence above the predetermined minimum bit level are output in the coded representation.

Preferably, in step (c), steps (a) and (b) are repeated otherwise until each bitplane of the selected region has been scanned. Each bitplane of the selected region above a minimum bit level is scanned.

In accordance with a second aspect of the invention, there is provided an apparatus for representing a digital image to provide a coded representation, the apparatus comprising:
  means for transforming the digital image to derive a plurality of coefficients, each coefficient represented by a predefined bit sequence;
  means for selecting a portion of the plurality of coefficients as a region;
  means for scanning the significance of each bitplane of the selected region from a most significant bitplane towards a least significant bitplane, and providing a first token for each insignificant bitplane and a second token for a significant bitplane in the coded representation until a significant bitplane is determined;
  means for partitioning the selected region into two or more subregions having a predetermined form, and setting each of the subregions as the selected region;
  means for controlling the scanning means and the partitioning means to carry out respective functioning of the scanning and partitioning means commencing from the significant bitplane until the selected region has a predetermined size or a predetermined minimum bit level has been reached, wherein the coefficients of the selected region are coded and provided in the coded representation.

In accordance with a third aspect of the invention, there is provided a computer program product including a computer readable medium having recorded thereon a computer program for representing a digital image to provide a coded representation, the computer program product comprising:
  means for transforming the digital image to derive a plurality of coefficients, each coefficient represented by a predefined bit sequence;
  means for selecting a portion of the plurality of coefficients as a region;
  means for scanning the significance of each bitplane of the selected region from a most significant bitplane towards a least significant bitplane, and providing a first token for each insignificant bitplane and a second token for a significant bitplane in the coded representation until a significant bitplane is determined;
  means for partitioning the selected region into two or more subregions having a predetermined form, and setting each of the subregions as the selected region;
  means for controlling the scanning means and the partitioning means to carry out respective functioning of the scanning and partitioning means commencing from the significant bitplane until the selected region has a predetermined size or a predetermined minimum bit level has been reached, wherein the coefficients of the selected region are coded and provided in the coded representation.

In accordance with a fourth aspect of the invention, there is provided a method for decoding a coded representation of a digital image, the method including the steps of:

selecting a region of coefficients of the coded representation of the digital image, the coded representation including a first token for each insignificant bitplane of the coefficients, a second token for each significant bitplane of the coefficients, and zero or more coded coefficients;

(a) scanning the coded representation of the selected region;

(b) if a first token is determined, providing an insignificant bitplane in an output stream for a current bitplane of coefficients of the selected region;

(c) if a second token is determined, providing a significant bitplane in the output stream for the current bitplane of the coefficients of the selected region and partitioning the selected region into two or more subregions having a predetermined form, and setting each of the subregions as the selected region;

(d) repeating steps (a) to (c) commencing from a predetermined bitplane until a predetermined minimum bit level has been reached, or until the selected region has a predetermined size wherein a coded coefficient of the selected region is decoded and provided in the output stream.

Preferably, the scanning is performed from a most significant bitplane towards a least significant bitplane. Further, the predetermined bitplane is the significant bitplane.

In accordance with a fifth aspect of the invention, there is provided an apparatus for decoding a coded representation of a digital image, the apparatus including:

means for selecting a region of coefficients of the coded representation of the digital image, the coded representation including a first token for each insignificant bitplane of the coefficients, a second token for each significant bitplane of the coefficients, and zero or more coded coefficients;

means for scanning the coded representation of the selected region;

means for, if a first token is determined, providing an insignificant bitplane in an output stream for a current bitplane of coefficients of the selected region;

means for, if a second token is determined, providing a significant bitplane in the output stream for the current bitplane of the coefficients of the selected region and partitioning the selected region into two or more subregions having a predetermined form, and setting each of the subregions as the selected region;

means for controlling the scanning means, the means for providing the insignificant bitplane, and means for providing said significant bitplane commencing from a predetermined bitplane until a predetermined minimum bit level has been reached, or until the selected region has a predetermined size wherein a coded coefficient of the selected region is decoded and provided in the output stream.

In accordance with a sixth aspect of the invention, there is provided a computer program product including a computer readable medium having recorded thereon a computer program for decoding a coded representation of a digital image, the computer program product comprising:

means for selecting a region of coefficients of the coded representation of the digital image, the coded representation including a first token for each insignificant bitplane of the coefficients, a second token for each significant bitplane of the coefficients, and zero or more coded coefficients;

means for scanning the coded representation of the selected region;

means for, if a first token is determined, providing an insignificant bitplane in an output stream for a current bitplane of coefficients of the selected region;

means for, if a second token is determined, providing a significant bitplane in the output stream for the current bitplane of the coefficients of the selected region and partitioning the selected region into two or more subregions having a predetermined form, and setting each of the subregions as the selected region;

means for controlling the scanning means, the means for providing the insignificant bitplane, and the means for providing the significant bitplane commencing from a predetermined bitplane until a predetermined minimum bit level has been reached, or until the selected region has a predetermined size wherein a coded coefficient of the selected region is decoded and provided in the output stream.

In accordance with a seventh aspect of the invention, there is provided a method of encoding a digital image, the method including the steps of:

decomposing the image using a discrete wavelet transform to provide a number of subbands;

for each subband, selecting the subband as an initial region and performing the following sub-steps:

(a) checking if a current bit level of the selected region is significant;

(b) if the current bit level is significant, outputting a first token in a coded representation and partitioning the selected region into a number of equally sized sub-regions, wherein each sub-region is processed as the selected region in turn;

(c) if the current bit level is insignificant, outputting a second token in the coded representation and selecting the next lower bit level of the selected region as the current bit level;

(d) repeating steps (a) to (c) until the current bit level is less than a specified minimum bit level, or the selected region has a predetermined size wherein coefficients of the selected region are coded in the coded representation.

Preferably, the coefficients of the selected region are coded by representing each coefficient by the bits between the corresponding current bit level and the minimum bit level.

In accordance with an eighth aspect of the invention, there is provided apparatus for encoding a digital image, the apparatus including:

means for decomposing the image using a subband transform to provide a number of subbands;

means for, for each subband, selecting the subband as an initial region and including the following:

means for checking if a current bit level of the selected region is significant;

means for, if the current bit level is significant, outputting a first token in a coded representation and partitioning the selected region into a number of equally sized sub-regions, wherein each sub-region is processed as the selected region in turn;

means for, if the current bit level is insignificant, outputting a second token in the coded representation and selecting the next lower bit level of the selected region as the current bit level; and means for controlling the checking means, the means for outputting the first token, and the means for outputting the second token to carry out respective functioning of the checking means, the means for outputting the first token, and the means for outputting the second token until the current bit level is less than a specified minimum bit level, or the selected region has a predetermined size wherein coefficients of the selected region are coded in the coded representation.

In accordance with a ninth aspect of the invention, there is provided a computer program product including a computer readable medium having recorded thereon a computer program for encoding a digital image, the computer program product including:

means for decomposing the image using a subband transform to provide a number of subbands;

means for, for each subband, selecting the subband as an initial region and including the following:

means for checking if a current bit level of the selected region is significant;

means for, if the current bit level is significant, outputting a first token in a coded representation and partitioning the selected region into a number of equally sized sub-regions, wherein each sub-region is processed as the selected region in turn;

means for, if the current bit level is insignificant, outputting a second token in the coded representation and selecting the next lower bit level of the selected region as the current bit level; and means for controlling the checking means, the means for outputting the first token, and the means for outputting the second token to carry out respective functioning of the checking means, the means for outputting the first token, and the means for outputting the second token until the current bit level is less than a specified minimum bit level, or the selected region has a predetermined size wherein coefficients of the selected region are coded in the coded representation.

In accordance with a tenth aspect of the invention, there is provided a method of decoding a coded representation of a digital image, the method including the steps of:

for each region of the coded representation corresponding to a subband, selecting a region of coefficients of the coded representation as an initial region, the coded representation containing a first token for each significant bit level, a second token for each insignificant bit level, and zero or more coded coefficients, each region comprising at least one coefficient, and performing the following sub-steps:

(a) checking a current bit level of the selected region of the coded representation for a token;

(b) if the current bit level has a first token, outputting a significant bit level and partitioning the selected region into a number of equally sized sub-regions, wherein each sub-region is processed as the selected region in turn;

(c) if the current bit level has a second token, outputting an insignificant bit level and selecting the next lower bit level of the selected region as the current bit level;

(d) repeating steps (a) to (c) until the current bit level is less than a specified minimum bit level, or the selected region has a predetermined size wherein at least one coded coefficient of the selected region is decoded for providing a subband for the selected region.

In accordance with an eleventh aspect of the invention, there is provided an apparatus for decoding a coded representation of a digital image, the apparatus including:

means for, for each region of the coded representation corresponding to a subband, selecting a region of coefficients of the coded representation as an initial region, the coded representation containing a first token for each significant bit level, a second token for each insignificant bit level, and zero or more coded coefficients, each region comprising at least one coefficient, and further including:

means for checking a current bit level of the selected region of the coded representation for a token;

means for, if the current bit level has a first token, outputting a significant bit level and partitioning the selected region into a number of equally sized sub-regions, wherein each sub-region is processed as the selected region in turn;

means for, if the current bit level has a second token, outputting an insignificant bit level and selecting the next lower bit level of the selected region as the current bit level;

means for controlling repeated functioning of the checking means, the partitioning means, and the means for selecting the next lower bit level until the current bit level is less than a specified minimum bit level, or the selected region has a predetermined size wherein at least one coded coefficient of the selected region is decoded for providing a subband for the selected region.

In accordance with a twelfth aspect of the invention, there is provided a computer program product including a computer readable medium having recorded thereon a computer program for decoding a coded representation of a digital image, the computer program product including:

means for, for each region of the coded representation corresponding to a subband, selecting a region of coefficients of the coded representation as an initial region, the coded representation containing a first token for each significant bit level, a second token for each insignificant bit level, and zero or more coded coefficients, each region comprising at least one coefficient, and further including:

means for checking a current bit level of the selected region of the coded representation for a token;

means for, if the current bit level has a first token, outputting a significant bit level and partitioning the selected region into a number of equally sized sub-regions, wherein each sub-region is processed as the selected region in turn;

means for, if the current bit level has a second token, outputting an insignificant bit level and selecting the next lower bit level of the selected region as the current bit level;

means for controlling repeated functioning of the checking means, the partitioning means, and the means for selecting the next lower bit level until the current bit level is less than a specified minimum bit level, or the selected region has a predetermined size wherein at least one coded coefficient of the selected region is decoded for providing a subband for the selected region.

In accordance with a thirteenth aspect of the invention, there is provided a method of encoding a digital image, the method including the steps of:

a) applying a subband transform to each of a plurality of blocks to provide a plurality of AC subband regions, at one or more resolutions, and a DC subband region for each block;

b) selecting the DC subband region as a selected region and performing the following sub-steps:
  ba) checking if a current bitplane of the selected region is significant;
  bb) if the current bitplane is significant, outputting a first token in a coded representation and partitioning the selected region into a number of sub-regions, wherein each sub-region is processed as the selected region in turn;
  bc) if the current bitplane is insignificant, outputting a second token in the coded representation and selecting the next lower bitplane of the selected region as the current bitplane;
  bd) repeating sub-steps ba) to bc) until the current bitplane is less than a specified minimum bitplane, or the selected region has a predetermined size and coefficients of the selected region are coded in the coded representation;
c) selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;
d) setting one or more AC subband regions, of a current resolution level, as a selected region and performing the sub-steps ba) to bd);
e) repeating step d) until substantially all AC subbands of the current resolution level have been encoded; and
f) repeating steps c) to e) until all AC subbands of each block have been encoded.

The method may further include the step of dividing the digital image into a plurality of blocks, the blocks being subband transformed to provide the plurality of AC subband regions and the DC subband region. Alternatively, the method may include the step of dividing subband transform coefficients of the digital image into a plurality of blocks to provide the plurality of AC subband regions and the DC subband region.

In accordance with a fourteenth aspect of the invention, there is provided an apparatus for encoding a digital image, the apparatus including:
  means for applying a subband transform to the digital image to provide a plurality of AC subband regions, at one or more resolutions, and a DC subband region for each block;
  means for selecting the DC subband region as a selected region, and further including:
    means for checking if a current bitplane of the selected region is significant;
    means for, if the current bitplane is significant, outputting a first token in a coded representation and partitioning the selected region into a number of sub-regions, wherein each sub-region is processed as the selected region in turn;
    means for, if the current bitplane is insignificant, outputting a second token in the coded representation and selecting the next lower bitplane of the selected region as the current bitplane;
    means for controlling repeated operation of the checking means, the first token outputting means, and the second token outputting means until the current bitplane is less than a specified minimum bitplane, or the selected region has a predetermined size and coefficients of the selected region are coded in the coded representation;
  means for selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;
  means for setting one or more AC subband regions, of a current resolution level, as a selected region and further including:
    means for checking if a current bitplane of the selected region is significant;
    means for, if the current bitplane is significant, outputting the first token in a coded representation and partitioning the selected region into a number of sub-regions, wherein each sub-region is processed as the selected region in turn;
    means for, if the current bitplane is insignificant, outputting the second token in the coded representation and selecting the next lower bitplane of the selected region as the current bitplane;
    means for controlling repeated operation of the checking means, the first token outputting means, and the second token outputting means until the current bitplane is less than a specified minimum bitplane, or the selected region has a predetermined size and coefficients of the selected region are coded in the coded representation;
  means for controlling repeated operation of the AC-subband-region setting means until substantially all AC subbands of the current resolution level have been encoded; and
  means for controlling repeated operation of the uncoded-AC-subband-regions selecting means, the AC-subband-region setting means, and the means for controlling the AC-subband-region setting means until all AC subbands of each block have been encoded.

In accordance with a fifteenth aspect of the invention, there is provided a computer program product including a computer readable medium having recorded thereon a computer program for encoding a digital image, the computer program product including:
  means for applying a subband transform to the digital image to provide a plurality of AC subband regions, at one or more resolutions, and a DC subband region for each block;
  means for selecting the DC subband region as a selected region, and further including:
    means for checking if a current bitplane of the selected region is significant;
    means for, if the current bitplane is significant, outputting a first token in a coded representation and partitioning the selected region into a number of sub-regions, wherein each sub-region is processed as the selected region in turn;
    means for, if the current bitplane is insignificant, outputting a second token in the coded representation and selecting the next lower bitplane of the selected region as the current bitplane;
    means for controlling repeated operation of the checking means, the first token outputting means, and the second token outputting means until the current bitplane is less than a specified minimum bitplane, or the selected region has a predetermined size and coefficients of the selected region are coded in the coded representation;

means for selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;

means for setting one or more AC subband regions, of a current resolution level, as a selected region and further including:
  means for checking if a current bitplane of the selected region is significant;
  means for, if the current bitplane is significant, outputting the first token in a coded representation and partitioning the selected region into a number of sub-regions, wherein each sub-region is processed as the selected region in turn;
  means for, if the current bitplane is insignificant, outputting the second token in the coded representation and selecting the next lower bitplane of the selected region as the current bitplane;
  means for controlling repeated operation of the checking means, the first token outputting means, and the second token outputting means until the current bitplane is less than a specified minimum bitplane, or the selected region has a predetermined size and coefficients of the selected region are coded in the coded representation;

means for controlling repeated operation of the AC-subband-region setting means until substantially all AC subbands of the current resolution level have been encoded; and means for controlling repeated operation of the uncoded-AC-subband-regions selecting means, the AC-subband-region setting means, and the means for controlling the AC-subband-region setting means until all AC subbands of each block have been encoded.

In accordance with a sixteenth aspect of the invention, there is provided a method of decoding a coded representation of a digital image, the method including the steps of:

a) selecting a region of the coded representation corresponding to the DC subband region as a selected region and performing the following sub-steps:
  aa) checking if a current bitplane of the selected region contains a first or second token;
  ab) if a first token is found in step aa), outputting a significant bitplane and partitioning the selected region into a number of sub-regions, wherein each sub-region is processed as the selected region in turn;
  ac) if a second token is found in step aa), outputting an insignificant bitplane and selecting the next lower bitplane of the selected region as the current bitplane;
  ad) repeating sub-steps aa) to ac) until the current bitplane is less than a specified minimum bitplane, or the selected region has a predetermined size and coded coefficients of the selected region are decoded;

b) selecting a remaining region of the coded representation corresponding to substantially all uncoded AC subband regions and checking each bitplane of the remaining region of each block from a most significant bitplane towards a least significant bitplane for a first or second token, and outputting an insignificant bitplane for each second token until a first token is determined;

c) outputting a significant bitplane for the first token and setting one or more regions of the coded representation corresponding to AC subband regions, of a current resolution level, as a selected region and performing the sub-steps aa) to ad);

d) repeating step c) until substantially all regions of the coded representation corresponding to AC subbands of the current resolution level have been decoded; and e) repeating steps b) to d) until all regions of the coded representation corresponding to the AC subbands of each block have been decoded.

Preferably, the method further includes the step of applying an inverse subband transform to the plurality of decoded AC subband regions, at one or more resolutions, and the decoded DC subband region for each block to provide the digital image.

In accordance with a seventeenth aspect of the invention, there is provided an apparatus for decoding a coded representation of a digital image, the apparatus including:
  means for selecting a region of the coded representation corresponding to the DC subband region as a selected region, the selecting means further including:
    means for checking if a current bitplane of the selected region contains a first or second token;
    means for, if a first token is found, outputting a significant bitplane and partitioning the selected region into a number of sub-regions, wherein each sub-region is processed as the selected region in turn;
    means for, if a second token is found, outputting an insignificant bitplane and selecting the next lower bitplane of the selected region as the current bitplane;
    means for controlling repeated operation of the checking means, the significant-bitplane outputting means, and the insignificant-bitplane outputting means until the current bitplane is less than a specified minimum bitplane, or the selected region has a predetermined size and coded coefficients of the selected region are decoded;

means for selecting a remaining region of the coded representation corresponding to substantially all uncoded AC subband regions and checking each bitplane of the remaining region of each block from a most significant bitplane towards a least significant bitplane for a first or second token, and outputting an insignificant bitplane for each second token until a first token is determined;

means for outputting a significant bitplane and setting one or more regions of the coded representation corresponding to AC subband regions, of a current resolution level, as a selected region, the outputting and setting means further including:
    means for checking if a current bitplane of the selected region contains a first or second token;
    means for, if a first token is found, outputting a significant bitplane and partitioning the selected region into a number of sub-regions, wherein each sub-region is processed as the selected region in turn;
    means for, if a second token is found, outputting an insignificant bitplane and selecting the next lower bitplane of the selected region as the current bitplane;
    means for controlling repeated operation of the checking means, the significant-bitplane outputting means, and the insignificant-bitplane outputting means until the current bitplane is less than a specified minimum bitplane, or the selected region has a predetermined size and coded coefficients of the selected region are decoded;

means for controlling repeated operation of the setting and outputting means until substantially all regions of the coded representation corresponding to AC subbands of the current resolution level have been decoded; and means for controlling repeated operation of
the means for selecting a remaining region of the coded representation corresponding to substantially all uncoded AC subband regions,
the means for outputting a significant bitplane and setting one or more regions of the coded representation corresponding to AC subband regions, and
means for controlling repeated operation of the setting and outputting means
until all regions of the coded representation corresponding to the AC subbands of each block have been decoded.

In accordance with an eighteenth aspect of the invention, there is provided a computer program product including a computer readable medium having recorded thereon a computer program for decoding a coded representation of a digital image, the computer program product including:

means for selecting a region of the coded representation corresponding to the DC subband region as a selected region, the selecting means further including:
means for checking if a current bitplane of the selected region contains a first or second token;
means for, if a first token is found, outputting a significant bitplane and partitioning the selected region into a number of sub-regions, wherein each sub-region is processed as the selected region in turn;
means for, if a second token is found, outputting an insignificant bitplane and selecting the next lower bitplane of the selected region as the current bitplane;
means for controlling repeated operation of the checking means, the significant-bitplane outputting means, and the insignificant-bitplane outputting means until the current bitplane is less than a specified minimum bitplane, or the selected region has a predetermined size and coded coefficients of the selected region are decoded;

means for selecting a remaining region of the coded representation corresponding to substantially all uncoded AC subband regions and checking each bitplane of the remaining region of each block from a most significant bitplane towards a least significant bitplane for a first or second token, and outputting an insignificant bitplane for each second token until a first token is determined;

means for outputting a significant bitplane and setting one or more regions of the coded representation corresponding to AC subband regions, of a current resolution level, as a selected region, the outputting and setting means further including:
means for checking if a current bitplane of the selected region contains a first or second token;
means for, if a first token is found, outputting a significant bitplane and partitioning the selected region into a number of sub-regions, wherein each sub-region is processed as the selected region in turn;
means for, if a second token is found, outputting an insignificant bitplane and selecting the next lower bitplane of the selected region as the current bitplane;
means for controlling repeated operation of the checking means, the significant-bitplane outputting means, and the insignificant-bitplane outputting means until the current bitplane is less than a specified minimum bitplane, or the selected region has a predetermined size and coded coefficients of the selected region are decoded;

means for controlling repeated operation of the setting and outputting means until substantially all regions of the coded representation corresponding to AC subbands of the current resolution level have been decoded; and means for controlling repeated operation of
the means for selecting a remaining region of the coded representation corresponding to substantially all uncoded AC subband regions,
the means for outputting a significant bitplane and setting one or more regions of the coded representation corresponding to AC subband regions, and
means for controlling repeated operation of the setting and outputting means
until all regions of the coded representation corresponding to the AC subbands of each block have been decoded.

BRIEF DESCRIPTION OF THE DRAWINGS

Embodiments of the invention are described with reference to the drawings, in which.

DETAILED DESCRIPTION

Overview

Figure 1:
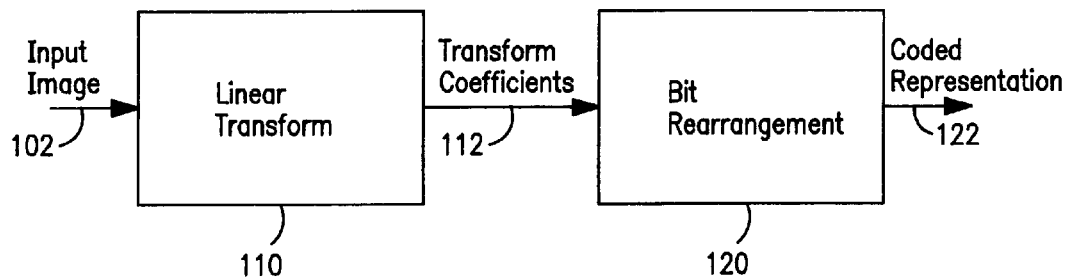
FIG. 1 is a high-level block diagram illustrating the image representation technique according to the embodiments of the invention.

A high-level block diagram is illustrated in FIG. 1 to provide an overview of the embodiments of the present invention. An input image 102 is provided to the transform block 110, which is preferably a linear transform, to produce corresponding transform coefficients 112. A discrete wavelet transform (DWT) is employed in the preferred embodiment of the invention.

The two-dimensional DWT of an image is a transform that represents the image using a low frequency approximation to the image and three high frequency detail components. Conventionally, these components are termed subbands. Each of the four sub-images formed by the DWT is one quarter of the size of the original image. The low frequency image contains most of the information about the original image. This energy compaction is the feature of the discrete wavelet transform image subbands that is exploited for image compression.

The single-level DWT can be applied recursively to the low frequency image, or subband, an arbitrary number of times. For example, a three-level DWT of the image is obtained by applying the transform once and then applying the DWT to the low subband resulting from the transformation. Thus, this results in 9 detail subbands and one (very) low frequency subband. Even after three levels of DWTs, the resulting low frequency subband still contains a significant amount of information of the original image, yet is 64 times smaller (¼×¼×¼), thereby effecting a factor of 64 in compression.

However, other linear transformations for decorrelating image data may be practiced without departing from the scope of the invention. For example, a discrete cosine transform (DCT) can be practiced. The transform coefficients 112, or more specifically the bit sequences representing their values, are then coded by the bit rearrangement block 120 in an efficient fashion to provide the coded representation 122.

The decoding process is simply the reverse of this encoding process. The encoded coefficients are decoded into the transform coefficients. The (transform domain) image is then inverse transformed to form the original image, or some approximation thereof.

Figure 8:
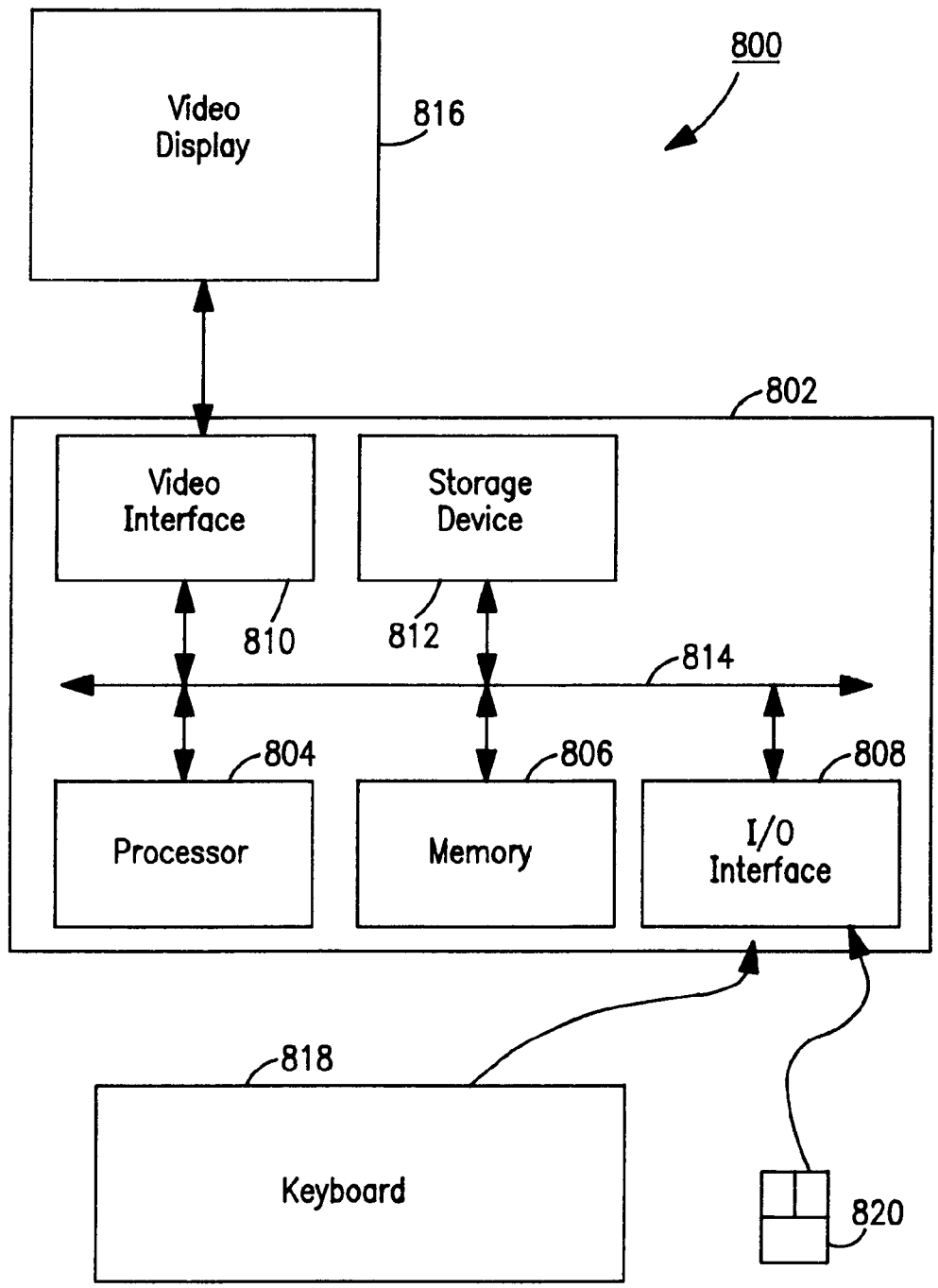
FIG. 8 is a block diagram of a general purpose computer with which the embodiment can be implemented.

The embodiments of the invention can preferably be practiced using a conventional general-purpose computer, such as the one shown in FIG. 8, wherein the processes of FIGS. 3 to 6 or FIGS. 9 to 12 are implemented as software executing on the computer. In particular, the steps of the coding and/or decoding methods are effected by instructions in the software that are carried out by the computer. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images and decoding coded representations of digital images in accordance with the embodiments of the invention. A system may be practiced for coding a digital image and decoding the corresponding coded representation of the image, or vice versa.

The computer system 800 consists of the computer 802, a video display 816, and input devices 818, 820. In addition, the computer system 800 can have any of a number of other output devices including line printers, laser printers, plotters, and other reproduction devices connected to the computer 802. The computer system 800 can be connected to one or more other computers using an appropriate communication channel such as a modem communications path, a computer network, or the like. The computer network may include a local area network (LAN), a wide area network (WAN), an Intranet, and/or the Internet.

The computer 802 itself consists of a central processing unit(s) (simply referred to as a processor hereinafter) 804, a memory 806 which may include random access memory (RAM) and read-only memory (ROM), an input/output (IO) interface 808, a video interface 810, and one or more storage devices generally represented by a block 812 in FIG. 8. The storage device(s) 812 can consist of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can consist of data, address, and control buses.

The video interface 810 is connected to the video display 816 and provides video signals from the computer 802 for display on the video display 816. User input to operate the computer 802 can be provided by one or more input devices. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include IBM-PC/ATs or compatibles, one of the Macintosh (™) family of PCs, Sun Sparcstation (™), or the like. The foregoing are merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and pixel data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

Before proceeding with a further description of the embodiments, a brief review of terminology used hereinafter is provided. For a binary integer representation of a number, "bit n" or "bit number n" refers to the binary digit n places to the left of the least significant bit (beginning with bit 0). For example, assuming an 8-bit binary representation, the decimal number 9 is represented as 00001001. In this number, bit 3 is equal to 1, while bits 2, 1, and 0 are equal to 0, 0, and 1, respectively.

For transform coding applications, the number of bits per coefficient required to represent the possible range of coefficients is determined by the linear transform and the resolution of each pixel (in bits per pixel) in the input image. This range of values for each pixel is typically large relative to the values of most of the transform coefficients, and thus many coefficients have a large number of leading zeros. For example, the number 9 has four leading zeros in an 8-bit representation and has 12 leading zeros in a 16-bit representation. The embodiments of the invention provide a method and apparatus of representing (or coding) these leading zeros, for blocks of coefficients, in an efficient manner. The remaining bits and sign of the number are encoded directly without modification.

To simplify the description and not to obscure unnecessarily the invention, the transform coefficients are assumed hereinafter to be represented in an unsigned binary integer form, with a single sign bit. That is, the decimal numbers −9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value, although this is not necessary for embodiments of the invention. Further, for the purpose of compression, any information contained in fractional bits is normally ignored.

A region consists of a set of contiguous image coefficients. The term coefficient is used hereinafter interchangeably with pixel, however, as will be well understood by a person skilled in the art, the former is typically used to refer to pixels in a transform domain (eg., a DWT domain).

Encoding Process of Preferred Embodiment

Figure 3:
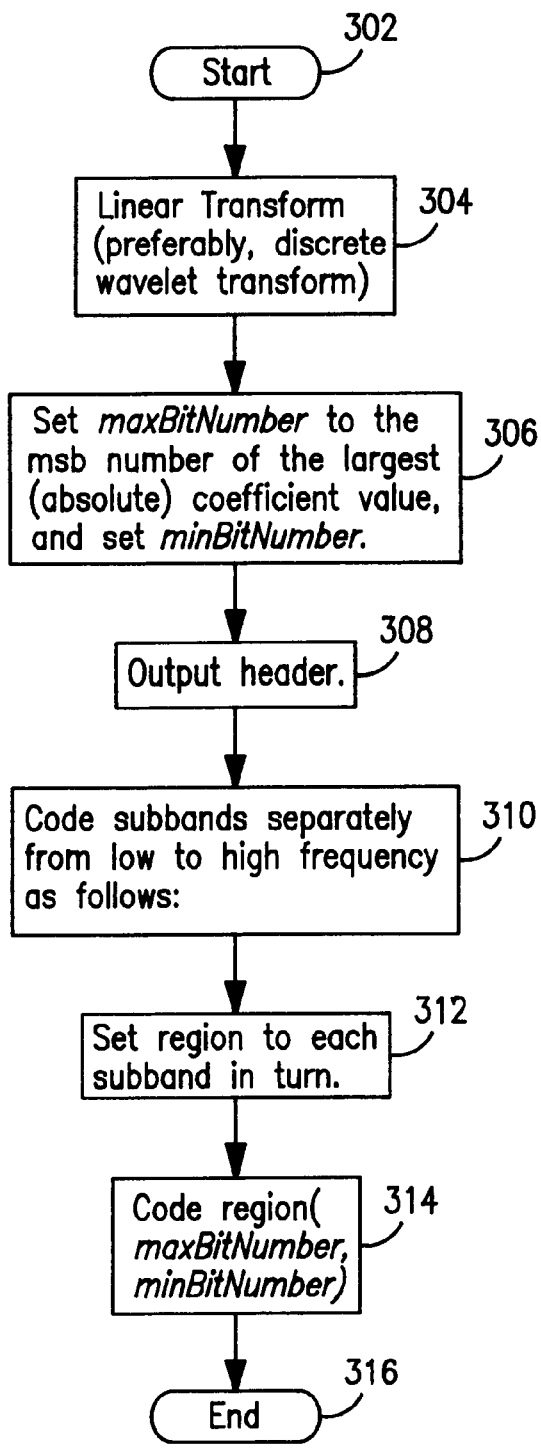
FIG. 3 is a flow diagram illustrating the method of representing, or encoding, an image according to the preferred embodiment.
Figure 4:
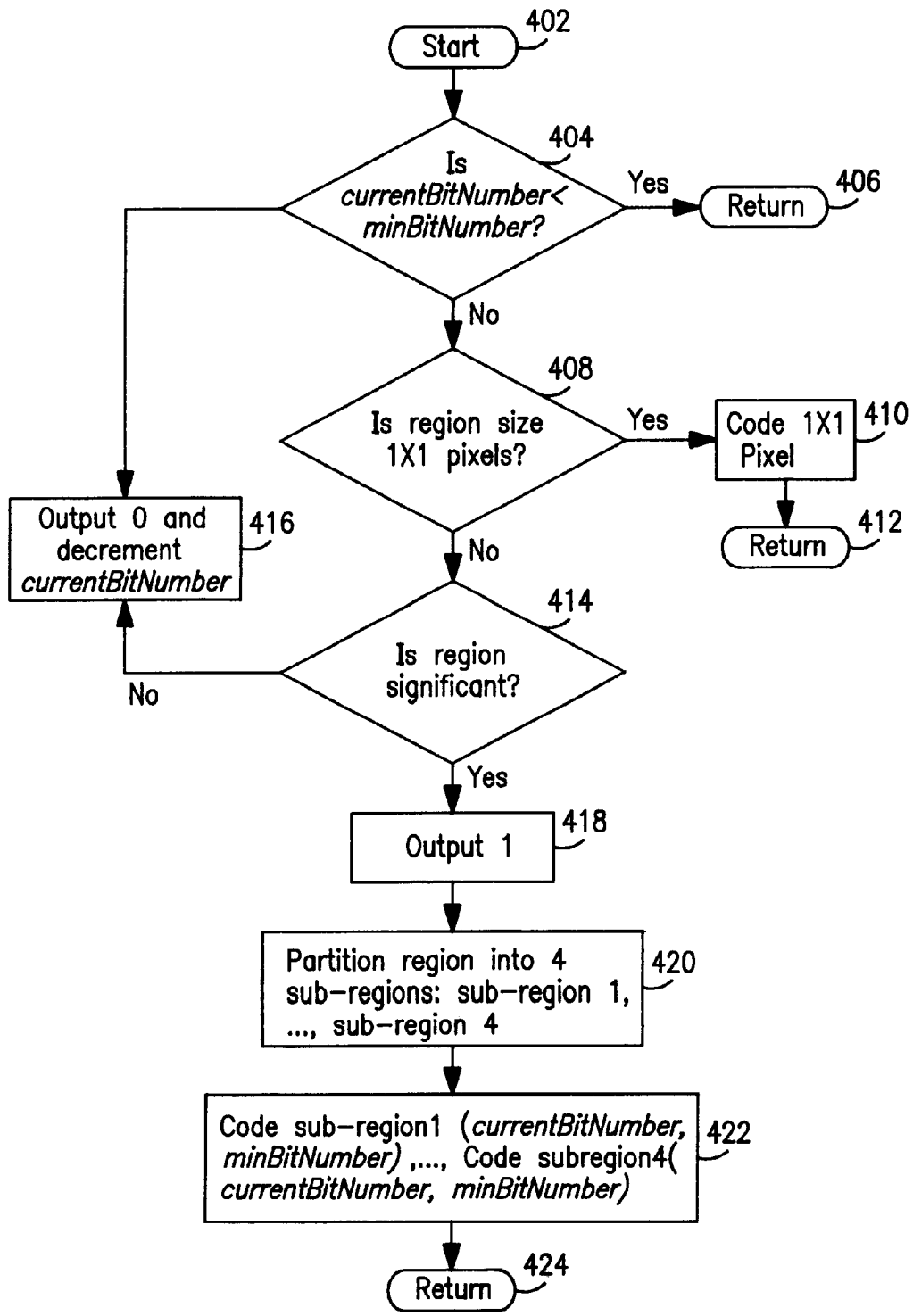
FIG. 4 is a detailed flow diagram illustrating the step of coding a region in FIG. 3.

A more detailed description of the preferred embodiment is provided with reference to FIGS. 3 and 4.

FIG. 3 is a flow diagram illustrating the image encoding method according to the preferred embodiment. In step 302, processing commences using an input image. In step 304, the input image is transformed using a linear transformation, preferably a discrete wavelet transform.

In step 306, the most significant bit (msb) of the largest absolute value of the transform coefficients is determined and a parameter, maxBitNumber, is set to this coefficient value. For example, if the largest transform coefficient has a binary value of 00001001 (decimal 9), the parameter maxBitNumber is set to 3, since the msb is bit number 3. Alternatively, the parameter maxBitNumber may be set to be any value that is larger than the msb of the largest absolute value of the transform coefficients. Each subband can be processed separately, setting each initial region to the whole subband in question. Alternatively, an initial region is defined to be the whole image. For example, in the case of a three-level DWT of the image, the resulting coefficients consisting of 10 subbands may be specified as the region.

Further, in step 306, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

Optionally, the technique involves step 308 which provides an output header in the coded representation of the input image. Thus, in a practical implementation, header information is output as part of the coded representation. For example, the output header of the embodiment of the invention may contain information about the source image, including the image height and width, the number of levels of the DWT, the mean value of the DC subband, the maxBitNumber parameter, and the minBitNumber parameter.

Beginning in step 310, each subband of the transformed image is coded separately in steps 312 and 314. Each subband is coded independently, in order from low frequency to high frequency. For the DC subband, the mean value is removed prior to coding and coded into the header information in step 308. In step 312, each subband is coded by setting an initial region as the whole subband. In step 314, the region is encoded with the maxBitNumber and minBitNumber as parameters. This provides a hierarchal code, since lower resolution versions of the image are coded into the bit stream before higher resolutions. Processing terminates in step 316.

FIG. 4 is a detailed flow diagram of the procedure "Code region(currentBitNumber, minBitNumber)" called in step 314 of FIG. 3 for coding each region, where maxBitNumber is provided as the currentBitNumber. In step 402, processing commences. The inputs to the region coding process of FIG. 4 include the currentBitNumber and minBitNumber parameters. Preferably, the method is implemented as a recursive technique where the process is able to call itself with a selected region or sub-region. However, the process may implemented in a non-recursive manner without departing from the scope and spirit of the invention.

In decision block 404, a check is made to determine if the currentBitNumber parameter is less than the minBitNumber parameter. If decision block 404 returns true (yes), nothing is done and processing returns to the calling procedure (or parent process) in step 406. This condition indicates that every coefficient in the selected region has a msb number less than minBitNumber. Otherwise, if decision block 404 returns false (no), processing continues at decision block 408.

In decision block 408, a check is made to determine if the selected region is a 1×1 pixel. While this embodiment is described with a predetermined size of 1×1 pixels, it will be apparent to one skilled in the art that different sizes may be practised without departing from the scope and spirit of the invention. The predetermined size can be M×N pixels, where both M and N are positive integers. For example, the predetermined size may be less than or equal to 2×2 pixels or coefficients. If decision block 408 returns true (yes), processing continues at step 410. In step 410, the 1×1 pixel is coded. Again, it will be apparent to one skilled in the art that different predetermined sizes (M×N pixels) may be practiced. Still further, the predetermined size may be less than or equal to 2×2 pixels or coefficients. Preferably, this step 410 involves directly outputting the remaining bits above the minBitNumber in the coded representation. In step 412, processing returns to the calling procedure. Otherwise, if decision block 408 returns false (no), the region consists of more than one coefficient and processing continues at decision block 414.

In decision block 414, the selected region is checked to determine if it is significant. That is, the significance of the region is rested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}|<2^n, \forall i,j \in R, \qquad (1)$$

where R denotes the region, and $c_{ij}$ denotes coefficient (i,j) in this region.

If decision block 414 returns false (no), processing continues at step 416. In step 416, a value of 0 (or first token) is output in the coded representation stream, and the currentBitNumber parameter is decremented by 1. That is, the next, lower bitplane of the region is selected for processing. Processing then continues at decision block 404, where the region is again processed with the parameters currentBitNumber−1 and minBitNumber. Otherwise, if decision block 414 returns true (yes), that is, the region is significant, processing continues at step 418.

In step 418, a value of 1 (or second token) is output in the coded representation stream. In step 420, the selected region is partitioned into a predetermined number (preferably, 4) of subregions using a specified partitioning algorithm or process. The partitioning process used is known to the decoder.

Figure 2:
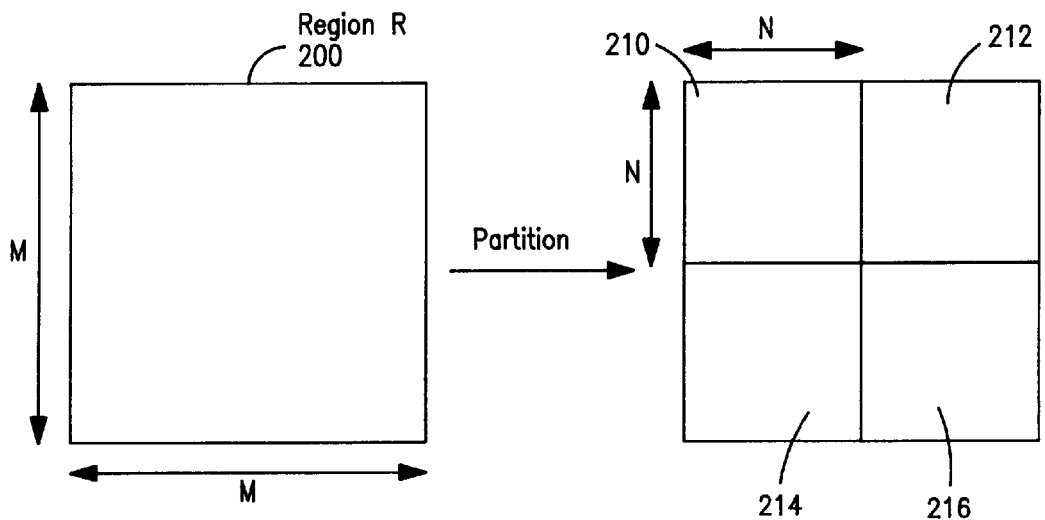
FIG. 2 is a diagram illustrating partitioning according to the preferred embodiment.

In this embodiment of the invention, square regions are used. A region is partitioned preferably into 4 equal-sized (square) subregions. As shown in FIG. 2, the selected region (R) 200 has a size of M×M coefficients and is partitioned into four equal-sized subregions 210, 212, 214 and 216. Each of the subregions has a size of N×N, where N is equal to M/2. This is not always possible depending on the size and shape of the initial region. If this is not possible, the initial region can be partitioned into a number of square regions, each having dimensions that are a power of 2, and these partitions can be encoded separately. In any case, this initialisation has minimal effect on the overall results if done in an intelligent fashion. In an alternate embodiment, a different partition may be used that is suitable for a block-based coder.

In step 422, each subregion is then coded with the same currentBitNumber and minBitNumber parameters. This is preferably done by means of a recursive call to the procedure "Code region(currentBitNumber, minBitNumber)" of FIG. 4. This coding of subregions may be implemented in parallel or sequentially. In the latter case, the processing may commence from a low frequency subband to higher frequency subbands in turn.

In the coded representation, a transform coefficient is coded by simply outputting the pixel bits from the currentBitNumber to the minBitNumber. Preferably, a convention is followed whereby the sign is output only if some of the coefficient bits are non-zero. For example, if currentBitNumber=3, minBitNumber=1, then −9 (00001001) is coded as "1 0 0" followed by a sign bit "1".

Optionally, the encoding process of the preferred embodiment (as well as those of the other embodiments) may be implemented using a simple form of quantisation that can be effected by scaling (dividing) data by some scale factor prior to encoding. The decoding process, described below, can likewise be followed by a step of inverse scaling, if the scaling step is employed as part of the relevant encoding process.

Still further, entropy coding (e.g. binary arithmetic coding) may be optionally used in conjunction with the encoding processes of the embodiments of the invention. That is, the above-described encoding process may be followed by a step of entropy encoding the encoded stream. If so, the decoding step described below may be preceded by an entropy decoding step for decoding the entropy coded stream.

Decoding Process of Preferred Embodiment

Figure 5:
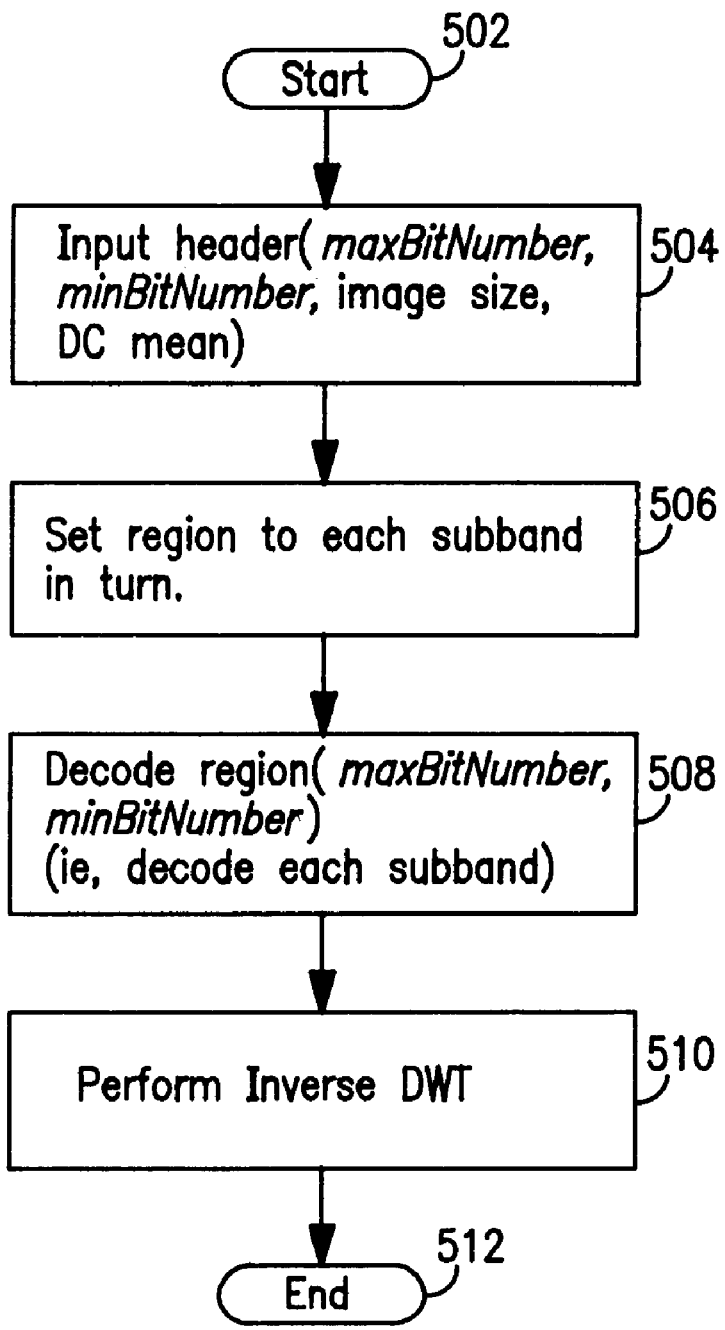
FIG. 5 is a flow diagram illustrating the method of decoding a coded representation of an image produced in accordance with the method FIG. 3.

FIG. 5 is a flow diagram illustrating a method of decoding the coded representation of an image obtained using the process of FIGS. 3 and 4. In step 502, processing commences using the coded representation. In step 504, the header information is read from the coded representation to determine the size of the original image. Also, information such as maxBitNumber (equal to the initial currentBitNumber in the coding process) and minBitNumber are input. Further information includes the mean value of the DC subband.

In step 506, decoding of each subband is commenced by setting the region to the respective subbands in turn. In step 508, the selected region is decoded using the maxBitNumber and minBitNumber parameters. In step 510, the inverse DWT is applied to the decoded image. Processing terminates in step 512.

Figure 6:
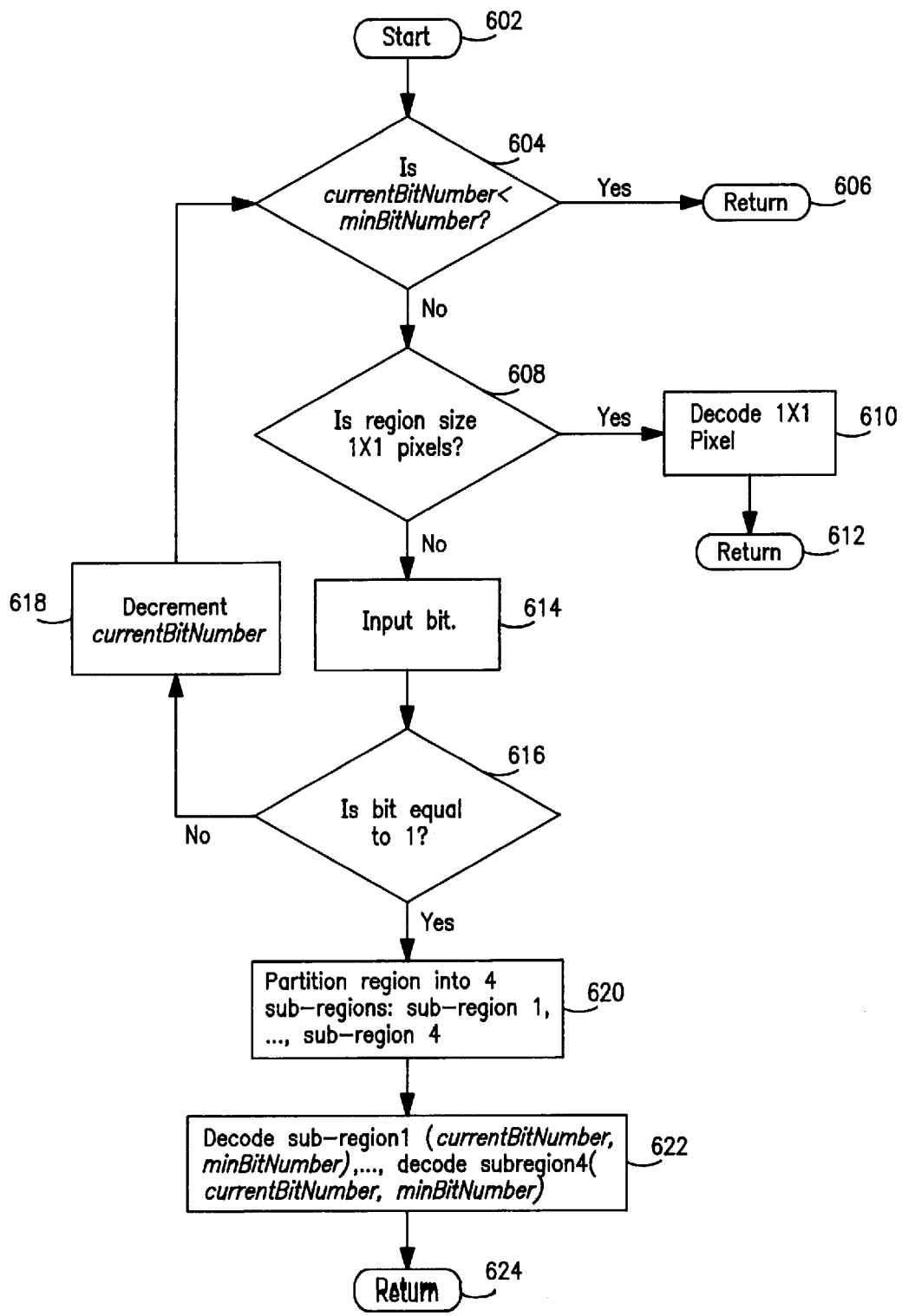
FIG. 6 is a detailed flow diagram illustrating the step of decoding a region in FIG. 5.

FIG. 6 is a detailed flow diagram of step 508 of FIG. 5 for decoding each region using procedure call "Decode region (currentBitNumber, minBitNumber)", where maxBitNumber is provided as the currentBitNumber. In step 602, processing commences. The inputs to the region decoding process of FIG. 6 are the currentBitNumber and minBitNumber parameters. Again, the method is preferably implemented as a recursive technique. However, the process may be implemented in a non-recursive manner without departing from the scope and spirit of the invention.

In decision block 604, a check is made to determine if the currentBitNumber is less than the minBitNumber. If decision block 604 returns true (yes), processing continues at step 606, where processing returns to the calling procedure. Otherwise, if decision block 604 returns false (no), processing continues at decision block 608.

In decision block 608, a check is made to determine if the selected region has a size of 1×1 pixels. If decision block 608 returns true (yes), processing continues at step 610. In step 610, the 1×1 region is decoded. Likewise, the size may be predetermined and be equal to M×N pixels, where both M and N are positive integers. For example, the size may be less than or equal to 2×2 pixels or coefficients. Processing then returns to the calling procedure in step 612. If decision block 608 returns false (no), processing continues at step 614. In step 614, a bit is input from the coded representation.

In decision block 616, a check is made to determine if the bit is equal to 1, that is, the input is checked to determine if the region is significant. If decision block 616 returns false (no), processing continues at step 618. In step 618, the currentBitNumber is decremented, and processing continues at decision block 604. Otherwise, if decision block 616 returns true (yes), processing continues at step 620. In step 620, the region is partitioned into the predetermined number (preferably, 4) of sub-regions. In step 622, each of the sub-regions is decoded using the currentBitNumber and minBitNumber. In the preferred embodiment, this is carried out by means of a recursive call to the process illustrated in FIG. 6. In step 624, processing returns to the calling procedure.

Thus, the bits output from the significance decisions in the encoder instruct the decoder on which path of the process to take, thus mimicking the encoder. The pixels, and possible sign, are decoded by simply reading in the appropriate number of bits (currentBitNumber to minBitNumber and if some of these are non-zero the sign bit).

Two-Dimensional Example

The method effectively codes the leading zeros of most transform coefficients, while coding the bits from the most significant bit to the predetermined least significant bit, specified by the parameter minBitNumber, and the sign simply as is. Thus, the preferred embodiment of the present invention advantageously represents the leading zeros. This method is very efficient in certain situations, namely for coding discrete wavelet transform image coefficients, which typically exhibit a large dynamic range. A few coefficients typically have very large values, while most have very small values.

Figures 7A, 7B, 7C, 7D:
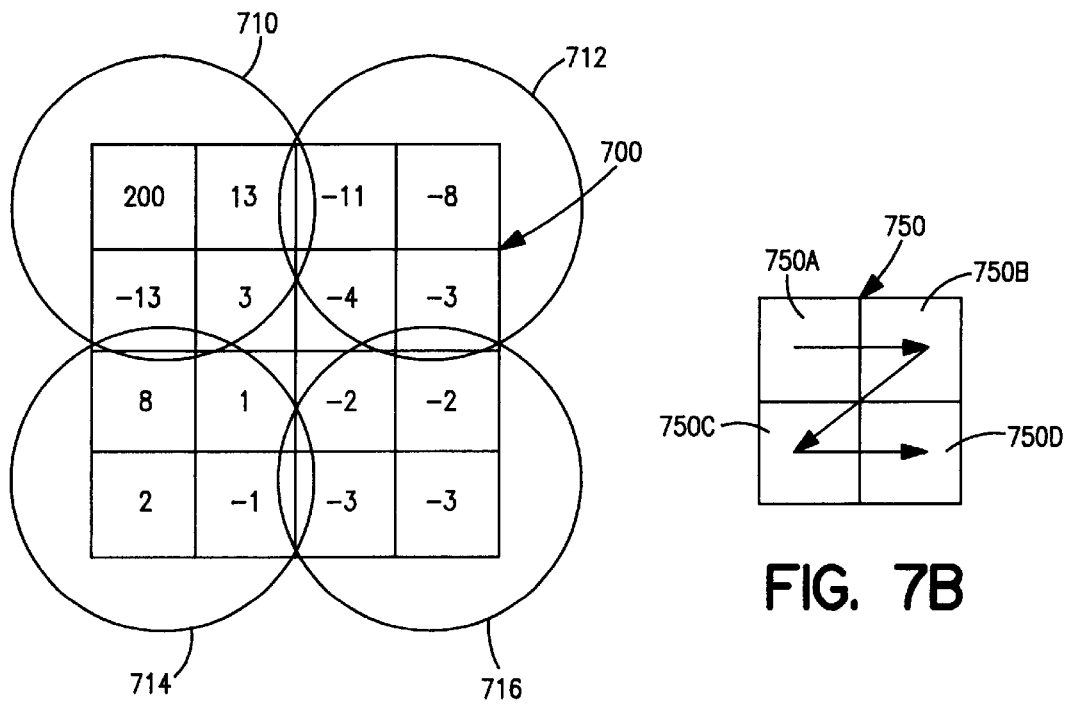
FIGS. 7A to 7D are diagrams illustrating the processing of a two-dimensional, eight-coefficient region in accordance with the encoding and decoding method of FIGS. 3 to 6.

An example of encoding a two-dimensional region comprising 4×4 coefficients is described with reference to FIGS. 7A to 7D. The processing of the 4×4 region 700 of FIG. 7A is commenced with the maxBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}.$$

The minBitNumber is set to 3, for illustrative purposes. A header is preferably output in the coded representation containing the maxBitNumber and minBitNumber. The process of coding the region 700 then follows.

At currentBitNumber=7, a one (1) is output since the region 700 is significant with respect to bit number 7 (see decision block 404, 408, and 414 and step 418 of FIG. 4). The region 700 is then partitioned into four sub-regions (see step 420 of FIG. 4); the top left region 710, the top right region 712, the bottom left region 714 and the bottom right region 716 of FIG. 7A. Each of the subregions consist of 2×2 coefficients.

The sub-regions 710, 712, 714 and 716 of FIG. 7A are in turn coded in the predefined processing sequence shown of FIG. 7B, where a region 750 consists of four sub-regions 750A to 750D. The three arrows illustrated in the diagram indicate the order or sequence of processing, that is, top left sub-region 750A, top right sub-region 750B, bottom left sub-region 750C and bottom right sub-region 750D, respectively.

The sub-region 710 of FIG. 7A is coded first (see step 422 of FIG. 4). For the currentBitNumber equal to 7, a one (1) is output in the coded representation. The sub-region 710 is then partitioned into four 1×1 pixels having decimal values 200, 13, −13 and 3. Each of these coefficients is coded by outputting the bits of each coefficient from the currentBitNumber=7 to the minBitNumber=3 (see decision block 408 and step 410 of FIG. 4). A sign bit is then output if required. Thus, the decimal value is 200 is coded as 11001 followed by the sign bit 0. The coefficient value 13 is coded as 00001 with a sign bit 0. The coefficient value −13 is coded as 00001 with a sign bit 1. Finally, the coefficient value 3 is coded as 00000 (without a sign bit). The coded representation of each coefficient includes the two "1" bits preceding the bits of coefficient "200" between the currentBitNumber and minBitNumber. This completes the coding of the top left sub-region 710. The coded output at this stage is:

$$1\underline{11001}\ \overset{sign\ bit}{\underline{0}}\ \underline{00001}\underline{000001}\underline{100000}.$$
$$\ \ \ \ \ 200\ \ \ \ \ \ \ \ \ \ \ \ \ \ \ 13\ \ \ \ -13\ \ \ \ \ 3$$

The header information is not shown in the foregoing expression.

The top right sub-region 712 is then coded (per FIG. 7B). A zero (0) is output for each of currentBitNumber equal to 7, 6, 5, and 4, since the region 712 is insignificant with respect to these bit numbers. A one (1) is output at currentBitNumber=3, since this bitplane is significant with respect to bit number 3. The sub-region 712 is partitioned into the four 1×1 pixels having values −11, −8, −4 and −3. These decimal values are coded as bit value 1 with sign bit 1, bit value 1 with sign bit 1 and bit values 0 and 0 without sign bits, respectively. Thus, at this stage, the coded representation is as follows:

$$1111001000001000001100000000001\ \underline{11}\ \underline{11}\ \underline{0}\ \underline{0}$$
$$\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ -11\ -8\ -4\ -3$$

The bottom left sub-region 714 is then encoded. A zero (0) is input for each of currentBitNumber equal to 7, 6, 5, and 4, since the region 714 is insignificant with respect to these bit numbers. A one (1) is output at currentBitNumber equal to 3, since this bitplane is significant with respect to bit number 3. The sub-region 714 is then partitioned into four 1×1 pixels having values 8, 1, 2 and −1. These are coded respective as binary value 1 with sign bit 0, and binary values 0,0 and 0 without sign bits.

Finally, the bottom right sub-region 716 having values −2, −2, −3, and −3 is coded. A zero (0) is output for each of currentBitNumber=7, 6, 5, 4 and 3 since the sub-region 716 is insignificant with respect to these bit numbers. No sign bits are output. Thus, the coded representation is as follows:

$$11110010000010000011000000000111110000001100000000.$$

The decoder simply mimics the encoding process to reconstruct the region from the coded representation as depicted in FIG. 7C.

The decoding process can be made "smarter" in a number of ways. One such "smarter" way is depicted in FIG. 7D. In this case, the magnitude of each of the non-zero coefficients is increased by half of 2 to the power of minBitNumber. This is depicted in FIG. 7D. In this manner, the "smart" decoding processing generally reduces the mean square error between the decoded and the original coefficients. Still further, the encoder can alternatively perform this (type of) operation, thereby leaving the decoder to use the simplest depicted in FIG. 7C.

Encoding Process of Alternate Embodiment

A coding process according to an alternate embodiment of the invention is hereinafter described with reference to FIGS. 9 to 12. The processes illustrated in the flow diagrams of FIGS. 9 to 12 may be implemented using software executing on a general-purpose computer, such as that of FIG. 8.

A discrete wavelet transform of an entire digital image can be performed on a block-by-block basis. The result of the transformation upon each block is a set of coefficients, which are essentially equivalent to a set of spatially corresponding coefficients of a discrete wavelet transform of the entire image. For example, from a predetermined set of coefficients of a DWT for an entire image, a portion or block of the digital image can be reproduced to a specified detail. Selecting the predetermined set of coefficients from the frequency domain amounts substantially to representing the corresponding portion of a digital image (the block) from the spatial domain. A block based DWT of a digital image can be performed by decomposing an image into a plurality of blocks and applying the transform to each block independently, thereby substantially evaluating those DWT coefficients relevant to the current spatial location. The advantage of adopting a block-based transform approach is that a block can be subsequently encoded with minimal interaction (substantially independent) from another block of the image. Block-based techniques are inherently memory localised and therefore are generally efficient when implemented using computer systems.

While blocking may be desirable, the embodiments of the invention may be practiced without this step. In fact, blocking of an image may only be done conceptually, and not actually. That is, blocking is not necessary depending upon the particular application. All that is necessary is that blocks of spatially corresponding blocks of DWT coefficients be grouped to form a block. For example, possibly overlapping blocks may be utilised, as described below.

Figure 9:
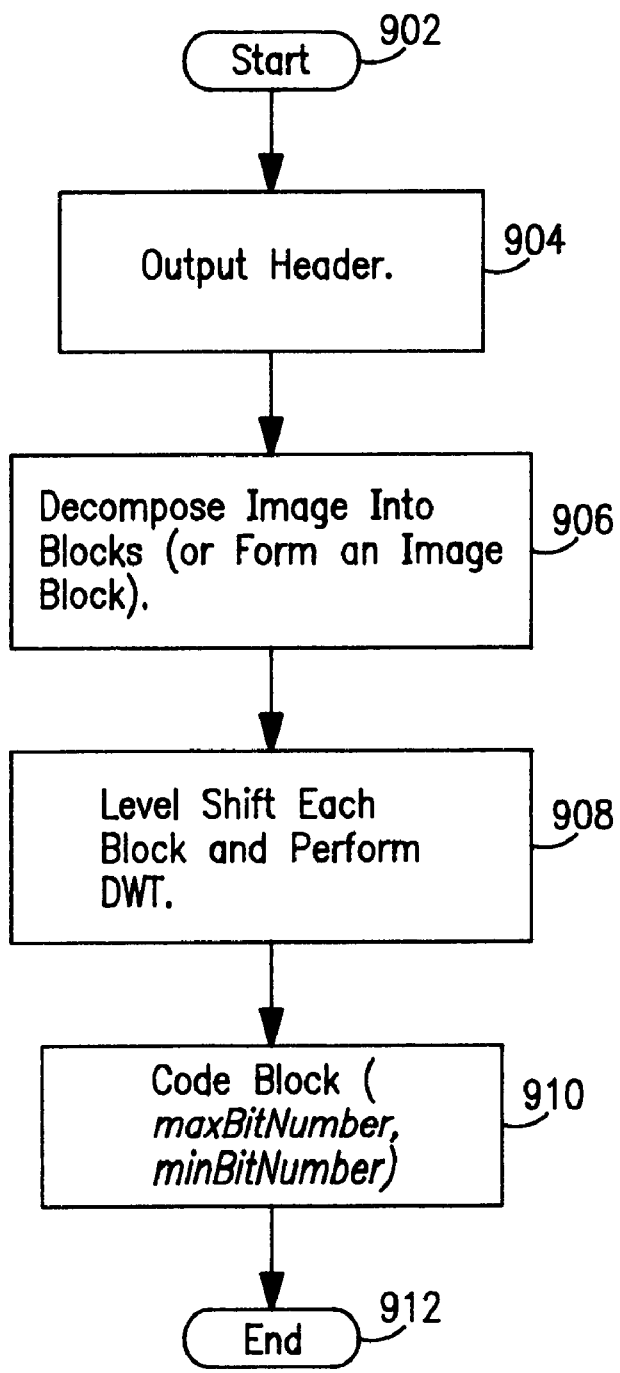
FIGS. 9 to 12 are flow diagrams illustrating a method of representing, or encoding, an image according to an alternate embodiment of the invention.

FIG. 9 is a flow diagram illustrating the block-based encoding process according to the alternate embodiment of the invention. Processing commences at step 902. In step 904, a header is output. This information preferably includes the image height and width, the block size, the number of levels of the DWT, and two coding parameters maxBitNumber and minBitNumber. Optionally, more or less header information my be used depending upon the application.

The coding parameter maxBitNumber can be selected in a variety of ways. If the block DWT is performed on all image blocks prior to coding of any of them, the maxBitNumber can be chosen to be the MSB number of the largest coefficient across all DWT blocks. For example, if the largest coefficient is 10000001 (decimal value 129), the maxBitNumber is set to 7 since the MSB is bit number 7. Alternatively, a deterministic bound can be used which is determined by the transform and the resolution of the input image. For example, with an 8-bit input image (level shifted to 7-bits plus sign) and the Haar transform, the largest MSB is bounded by J+7 where J is the number of levels of the DWT. If the blocks are small, the selection of this parameter can have a significant effect on compression. In some instances, more sophisticated ways of selecting maxBitNumber may be employed. However, this depends upon the specific application.

The parameter minBitNumber determines the compression ratio versus quality trade off and can be varied. For example, for nearly orthogonal transforms, a value of 3 provides adequate image quality for 8-bit, grey-scale or 24-bit, RGB images.

In step 906, the image is decomposed into blocks (or an image block is formed). The image is decomposed preferably into overlapping blocks. However, non-overlapping blocks may be employed. The block of coefficients can be as large as the whole original image, or as small as a block of 8×8 coefficients (for a three-level transform). For low memory applications, a block that is as small as possible may be employed. Generally, a block size of 16 coefficients is sufficient for higher levels of compression with a three or four level DWT. A block size of 8×8 coefficients with a three-level DWT can maintain good coding efficiency by employing differential pulse code modulation (DPCM) on the DC coefficient of each block.

In step 908, each block is level shifted and the transform is performed. Preferably, a DWT is employed. The image values are level shifted (for example, by 128 for an 8-bit image) to reduce or eliminate any undue mean bias, and each spatial block of the image is transformed. For a DWT, usually some knowledge of the block surrounding the current block is needed (and similarly for the inverse DWT), although this is not strictly required.

In step 910, the block is coded using the maxBitNumber and minBitNumber parameters. Processing terminates in step 912.

Figure 10:
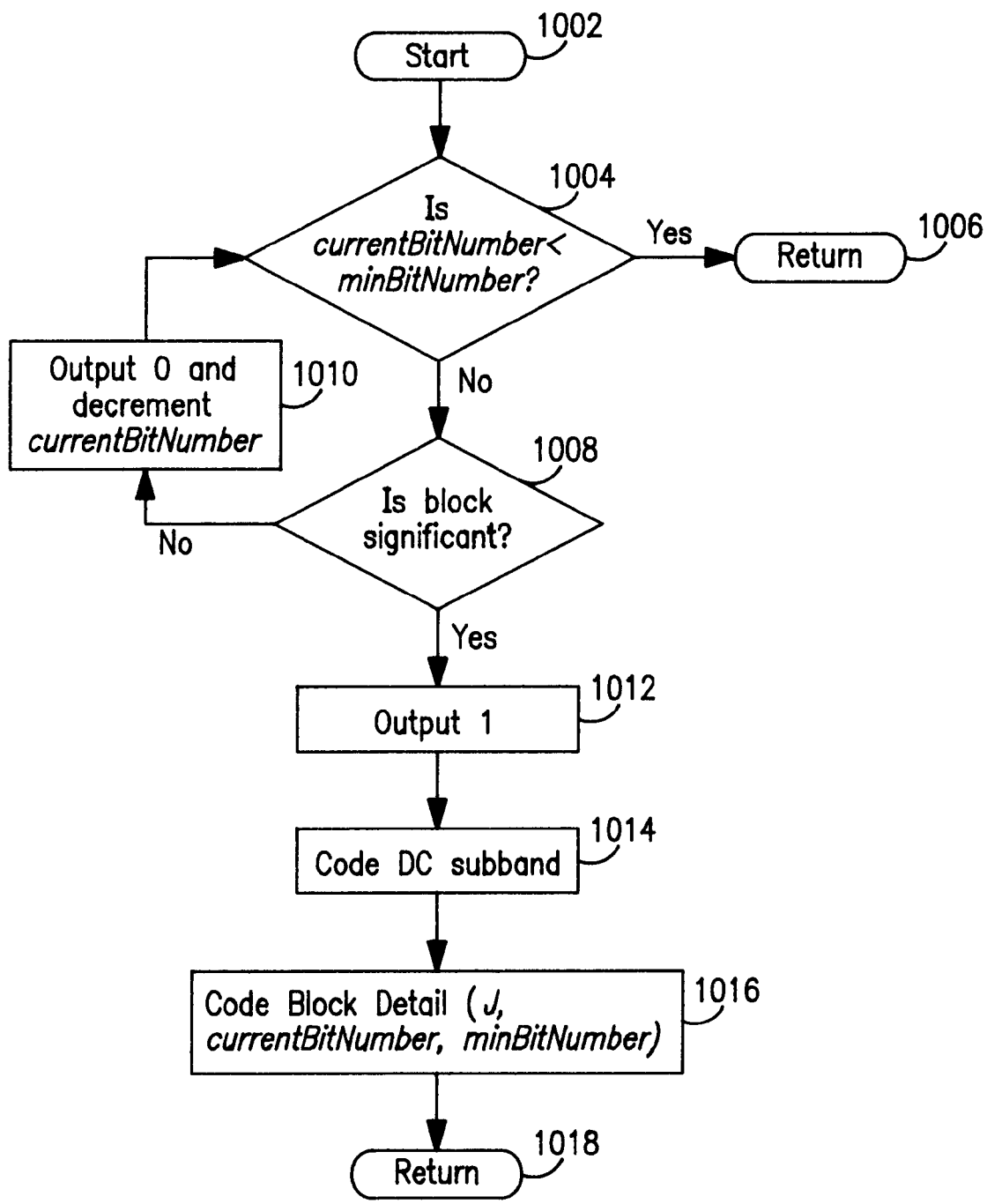

Step 910 for coding a block is illustrated in detail in the flow diagram of FIG. 10. Inputs to the block coding process of FIG. 10 include the currentBitNumber and the minBitNumber parameters. With reference to step 910 of FIG. 9, the maxBitNumber is input as the currentBitNumber parameter. Processing commences in step 1002. In decision block 1004, a check is made to determine if the currentBitNumber is less than the minBitNumber. If decision block 1004 returns true (yes), processing continues at step 1006. In step 1006, execution returns to the calling process, thereby indicating that every coefficient in the block has an MSB number less than the minBitNumber. Otherwise, if decision block 1004 returns false (no), processing continues at decision block 1008.

In decision block 1008, a check is made to determine if a current block is significant. If decision block 1008 returns false (no), processing continues at step 1010. In step 1010, a zero (0) is output in the coded representation and the currentBitNumber is decremented, that is, the next lower bit plane is selected. Processing then continues at decision block 1004. Otherwise, if decision block 1008 returns true (yes) processing continues at step 1012.

Decision blocks 1004 and 1008 along with step 1010 enable the process to find the MSB number of the largest coefficient in the block. A block is insignificant with respect to the currentBitNumber if the MSB number of every coefficient in the block is less than the currentBitNumber. This is repeated until the bitplane of the block is significant or the currentBitNumber is less than the minBitNumber.

In step 1012, a one (1) is output in the coded representation to indicate the bitplane is significant. In step 1014, the DC subband is coded. In step 1016, the block detail is coded using the parameters J, currentBitNumber and minBitNumber. In step 1018, execution returns to the calling procedure. Thus, given that the block is significant, steps 1012, 1014 and 1016 are carried out to use the (generalised) quadtree segmentation to find all coefficients with an MSB number greater than the minBitNumber. If the block is significant, it is partitioned into two "sub-blocks": the DC subband coefficients and the block consisting of the remaining coefficients, referred to as the "block detail" for level J since it represents the high frequency information about the block of level J at all lower levels.

Figure 13:
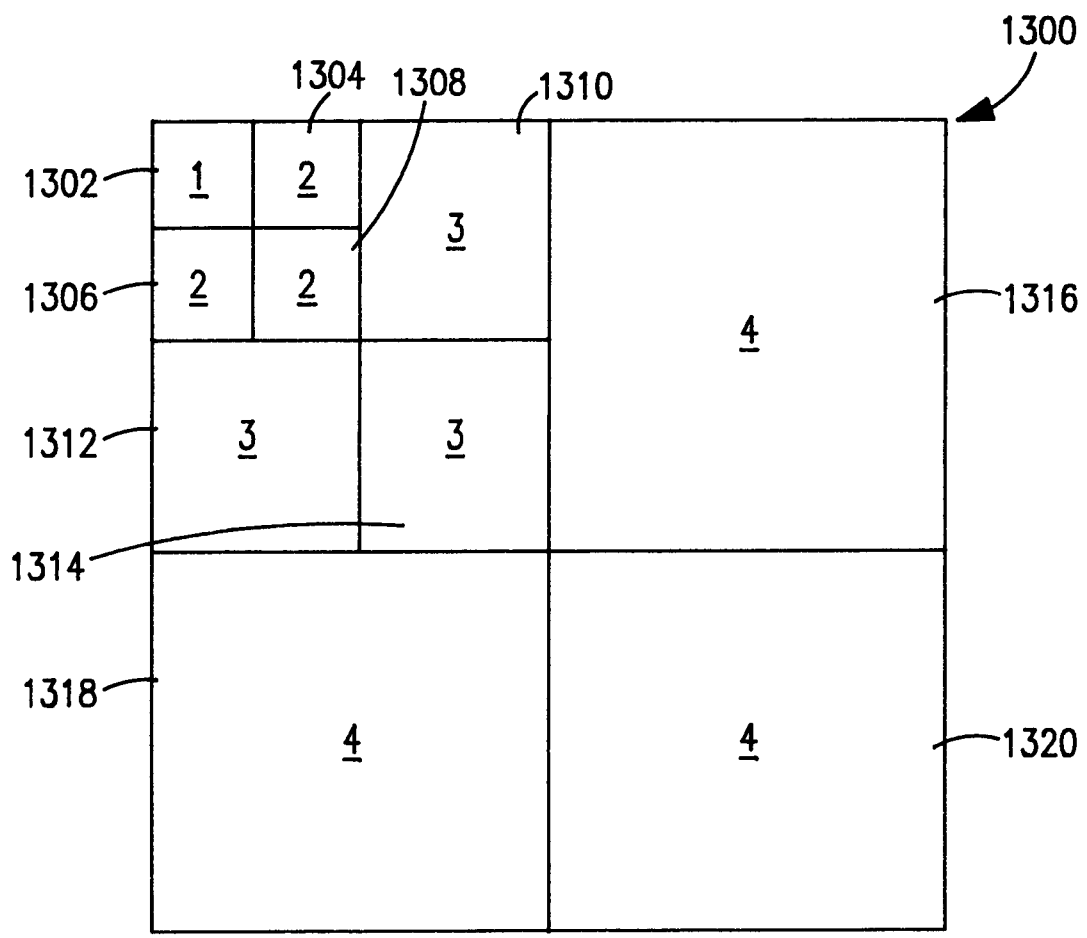
FIG. 13 is a block diagram illustrating level or octave partitioning of a block of transform coefficients.

FIG. 13 is a block diagram illustrating level or octave partitioning of a block 1300 of coefficients. Given the block 1300 of spatially related transform coefficients, arranged in terms of increasing frequency, the region is partitioned in an octave manner. This partitioning is indicated by the intersecting lines within the boundary of block 1300. For example, the block 1300 of FIG. 13 may be a block of spatially related DWT coefficients where the lines indicate the boundaries of subbands 1302 to 1320. Alternatively, the block 1300 may equally represent a block of discrete cosine transform (DCT) coefficients.

The initial partitioning of the block 1300 is into two sub-blocks: a small block 1302 (indicated with labelling as level 1) containing the DC coefficient(s), and one detail block containing all the remaining coefficients (i.e., the detail). This detail block is further partitioned into four sub-blocks: the three small blocks 1304, 1306 and 1308 (i.e. level 2), and a further detail block containing the remaining coefficients (i.e. larger blocks 1310 to 1320). Similarly, this further detail block is partitioned into four more sub-blocks: the three mid-size blocks 1310, 1312 and 1314 (i.e., level 3), and a new detail block containing the remaining coefficients. Finally, the last detail block is partitioned into the three large blocks 1316, 1318, and 1320 (i.e., level 4). The level 3 and 4 blocks 1310 to 3120 (and possibly the level 1 and 2 blocks) are partitioned according to the quadtree partition.

Figure 12:
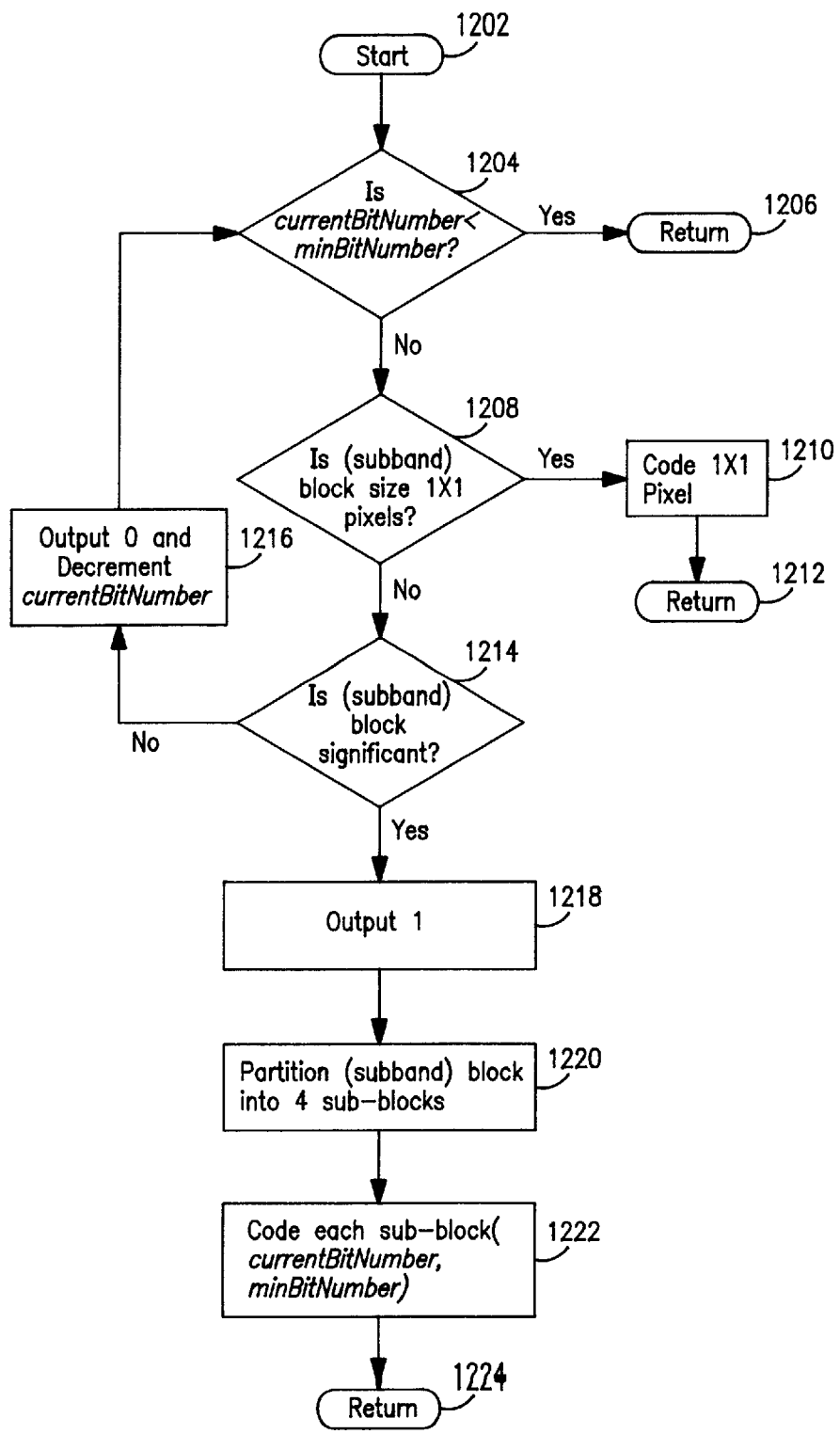

Step 1014 of FIG. 10 for coding the DC subband is illustrated in detail by the flow diagram of FIG. 12. That is, FIG. 12 shows the process of coding a subband or sub-block using currentBitNumber and minBitNumber parameters. In step 1202, processing commences. In decision block 1204, a check is made to determine if the currentBitNumber is less than the minBitNumber. If decision block 1204 returns true (yes), processing continues at step 1206. In step 1206, execution returns to the calling procedure. Otherwise, if decision block 1204 returns false (no), processing continues at decision block 1208.

In decision block 1208 a check is made to determine if the (subband) block size is 1×1 pixels. If decision block 1208 returns true (yes), processing continues at step 1210. In step 1210, the 1×1 pixel is coded. This involves outputting the bits between the currentBitNumber and the minBitNumber, inclusive, followed by a sign bit if necessary. Processing then returns to the calling procedure in step 1212. Otherwise, if decision block 1208 returns false (no), processing continues at decision block 1214.

In decision block 1214, a check is made to determine if the (subband) block is significant. If decision block 1214 returns false (no), processing continues at step 1216. In step 1216, a zero (0) is output in the coded representation and the currentBitNumber is decremented. Processing then continues at decision block 1204. Otherwise, if decision block 1214 returns true (yes), processing continues at step 1218.

In step 1218, a one (1) is output in the coded representation to indicate that the (subband) block is significant. In step 1220, the (subband) block is partitioned into four sub-blocks. In step 1222, each sub-block is coded using the parameters currentBitNumber and minBitNumber, by means of a recursive call to the process of FIG. 12. In step 1224, execution returns to the calling procedure.

Thus, in the process of FIG. 12, a subband or sub-block thereof is coded. The largest MSB number is isolated as before. If the sub-block consists of only one pixel, it is coded as a single coefficient. Otherwise, the currentBitNumber is decremented and a zero (0) is output in the coded representation until the currentBitNumber is less than the minBitNumber, or the subband (sub-block) is significant. If the subband (sub-block) is significant, it is partitioned into four (as close to equal as possible) sub-blocks, and these are coded in turn. A single coefficient, for example the DC coefficient, is encoded by outputting the coefficient bits from the currentBitNumber to the minBitNumber. Again, the sign is preferably only output if some of the coefficient bits are non-zero.

Figure 11:
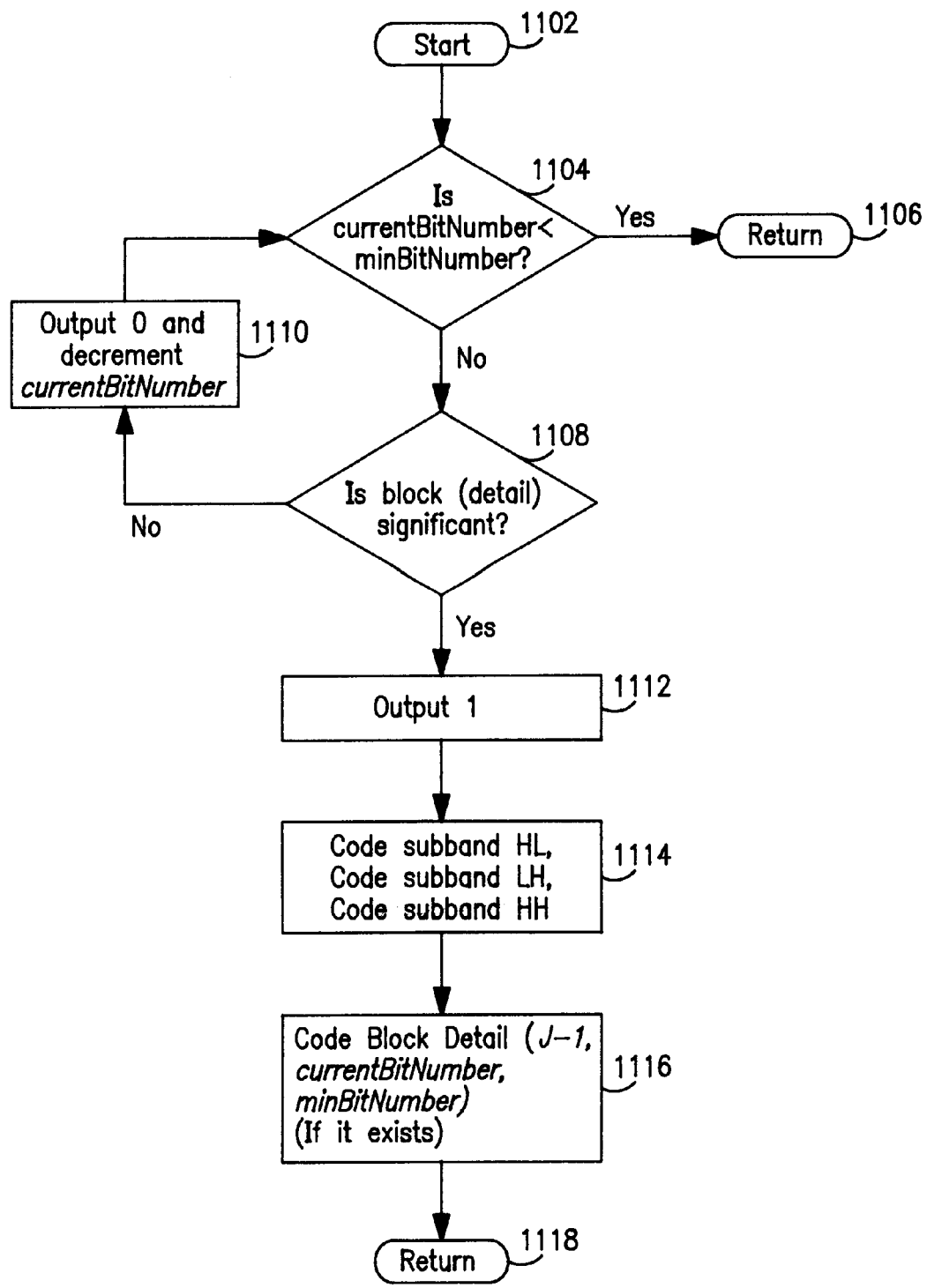

Step 1016 of FIG. 10 for coding block detail is illustrated by the flow diagram of FIG. 11. In step 1102, processing commences. In decision block 1104, a check is made to determine if the currentBitNumber is less than the minBitNumber. If decision block 1104 returns true (yes), execution returns to the calling procedure in step 1106. Otherwise, if decision block 1104 returns false (no), processing continues at decision block 1108.

In decision block 1108, a check is made to determine if the block (detail) is significant. If decision block 1108 returns false (no), processing continues at step 1110. In step 1110, a zero (0) is output in the coded representation and the currentBitNumber is decremented. Processing then continues at decision block 1104. Otherwise, if decision block 1108 returns true (yes), processing continues at step 1112.

In step 1112, a one (1) is output in the coded representation to indicate that the block (detail) is significant. In step 1114, each of the high-low (HL), low-high (LH), and high-high (HH) frequency subbands at a current level is coded. The HL, LH, and HH frequency subbands of each resolution are commonly referred to as AC subbands. Each of these subbands is coded in accordance with the process of FIG. 12. In step 1116, the block detail is coded using the parameters J−1, currentBitNumber and minBitNumber (if the block detail exists) by means of a recursive call to the process illustrated in FIG. 11. Execution returns to the calling procedure in step 1118.

Thus, the block detail for level J is processed to first isolate the MSB number of the largest coefficient. This is done by decrementing the currentBitNumber and outputting zeros until the block is significant. The block is then partitioned into the three high frequency subbands at level J and the block detail for level J−1 (if J−1 is greater than 0). This partitioning approach is motivated by the so called 1/f type spectral models.

The decoding process for the alternate embodiment can be implemented by mimicking the coding process described with reference to FIGS. 9 to 12.

The embodiments of the invention provide methods and apparatuses for representing digital image data in an efficient and flexible manner, in which the representation is suitable for storing and/or transmitting images. The encoding techniques can be used generally to represent an array of transform coefficients, and to provide an efficient representation by representing an image in the discrete wavelet transform domain. In particular, the embodiments provide methods and apparatuses for representing (or coding) leading zeros of blocks of transform coefficients obtained from an input image. The techniques are efficient in terms of offering a good reproduction of the original image for a given size code and offering fast decoding. Further, the techniques are flexible in that coefficients obtained from a linear transformation are encoded independently without the use of entropy coding. The advantageous aspects of the embodiment include the depth first nature of the coding. Further, in the case of coding subbands, the advantageous aspects of the invention include hierarchical coding of each subband separately.

The foregoing only describes a small number of embodiments of the present invention, however, modifications and/or changes can be made thereto by a person skilled in the art without departing from the scope and spirit of the invention. For example, in the foregoing description, the embodiments of the invention have been described with reference to a subregion having a predetermined size of 1×1 coefficient. However, it will be apparent to one skilled in the art that a different size may be practiced without departing from the scope and spirit of the invention. The embodiments of the invention may be practiced with 2×2 coefficients, for instance.

What is claimed is:

1. A method of representing a digital image to provide a coded representation, said method including the steps of:

transforming said digital image to derive a plurality of coefficients, each coefficient represented by a predefined bit sequence, wherein each bit of said bit sequence has a defined bitplane representing a position of said bit in said bit sequence;

selecting a portion of said plurality of coefficients as a region;

(a) scanning each bitplane of said selected region from a most significant bitplane towards a least significant bitplane to determine the significance of each bit plane within said selected region, and providing a first token for each insignificant bitplane and a second token for a significant bitplane in said coded representation until a significant bitplane is determined;

(b) performing at least octave partitioning on said selected region to form two or more subregions, and setting each of said subregions as said selected region; and (c) repeating steps (a) and (b) commencing from said significant bitplane until a predetermined minimum bitplane has been reached, or said selected region has a predetermined size wherein said coefficients of said selected region are coded and provided in said coded representation.

2. The method according to claim 1, wherein said transforming step includes applying a discrete wavelet transform to said digital image.

3. The method according to claim 1, wherein said region includes said entire plurality of coefficients.

4. The method according to claim 2, wherein said portion includes a subband of said plurality of coefficients.

5. The method according to claim 1, wherein said first and second tokens include bit values of 0 and 1, respectively.

6. The method according to claim 1, wherein said subregions are equally sized.

7. The method according to claim 6, wherein said subregions are square.

8. The method according to claim 1, wherein said predetermined size of said subregion is less than or equal to 2×2 coefficients.

9. The method according to claim 8, wherein coefficients of said predetermined size subregion are encoded by outputting bits of said corresponding bit sequence beginning with the respective significant bitplane.

10. The method according to claim 9, wherein only bits of said corresponding bit sequence above said predetermined minimum bitplane are output in said coded representation.

11. The method according to claim 1, wherein, in step (c), steps (a) and (b) are repeated otherwise until each bitplane of said selected region has been scanned.

12. The method according to claim 11, wherein each bitplane of said selected region above said minimum bitplane has been scanned.

13. An apparatus for representing a digital image to provide a coded representation, said apparatus comprising:

means for transforming said digital image to derive a plurality of coefficients, each coefficient represented by a predefined bit sequence, wherein each bit of said bit sequence has a defined bitplane representing a position of said bit in said bit sequence;

means for selecting a portion of said plurality of coefficients as a region;

means for scanning each bitplane of said selected region from a most significant bitplane towards a least significant bitplane to determine the significance of each bitplane within said selected region, and providing a first token for each insignificant bitplane and a second token for a significant bitplane in said coded representation until a significant bitplane is determined;

means for performing at least octave partitioning on said selected region to form two or more subregions, and setting each of said subregions as said selected region; and means for controlling said scanning means and said partitioning means to carry out respective functioning of said scanning and partitioning means commencing from said significant bitplane until said selected region has a predetermined size or a predetermined minimum bitplane has been reached, wherein said coefficients of said selected region are coded and provided in said coded representation.

14. The apparatus according to claim 13, wherein said transforming means includes means for applying a discrete wavelet transform to said digital image.

15. The apparatus according to claims 13, wherein said region includes said entire plurality of coefficients.

16. The apparatus according to claim 14, wherein said portion includes a subband of said plurality of coefficients.

17. The apparatus according to claim 13, wherein said first and second tokens include bit values of 0 and 1, respectively.

18. The apparatus according to claim 13, wherein said subregions are equally sized.

19. The apparatus according to claim 18, wherein said subregions are square.

20. The apparatus according to claim 13, wherein said predetermined size of said subregion is less than or equal to 2×2 coefficients.

21. The apparatus according to claim 20, wherein coefficients of said predetermined size subregion are encoded by outputting bits of said corresponding bit sequence beginning with the respective significant bitplane.

22. The apparatus according to claim 21, wherein only bits of said corresponding bit sequence above said predetermined minimum bitplane are output in said coded representation.

23. The apparatus according to claim 13, wherein said control means controls said scanning and partitioning means to repetitively function until each bitplane of said selected region has been scanned.

24. The apparatus according to claim 23, wherein each bitplane said selected region above said minimum bitplane has been scanned.

25. The apparatus according to claim 13, wherein said apparatus is implemented using a general-purpose digital computer.

26. A computer program product including a computer readable medium having recorded thereon a computer program for representing a digital image to provide a coded representation, said computer program product comprising:

means for transforming said digital image to derive a plurality of coefficients, each coefficient represented by a predefined bit sequence, wherein each bit of said bit sequence has a defined bitplane representing a position of said bit in said bit sequence;

means for selecting a portion of said plurality of coefficients as a region;

means for scanning of each bitplane of said selected region from a most significant bitplane towards a least significant bitplane to determine the significance of each bit plane within said selected region, and providing a first token for each insignificant bitplane and a second token for a significant bitplane in said coded representation until a significant bitplane is determined;

means for performing at least octave partitioning on said selected region to form two or more subregions, and setting each of said subregions as said selected region; and means for controlling said scanning means and said partitioning means to carry out respective functioning of said scanning and partitioning means commencing from said significant bitplane until said selected region has a predetermined size or a predetermined minimum bitplane has been reached, wherein said coefficients of said selected region are coded and provided in said coded representation.

27. The computer program product according to claim 26, wherein said transforming means includes means for applying a discrete wavelet transform to said digital image.

28. The computer program product according to claims 26, wherein said region includes said entire plurality of coefficients.

29. The computer program product according to claim 27, wherein said portion includes a subband of said plurality of coefficients.

30. The computer program product according to claim 26, wherein said first and second tokens include bit values of 0 and 1, respectively.

31. The computer program product according to claim 26, wherein said subregions are equally sized.

32. The computer program product according to claim 31, wherein said subregions are square.

33. The computer program product according to claim 26, wherein said predetermined size of said subregion is less than or equal to 2×2 coefficients.

34. The computer program product according to claim 33, wherein coefficients of said predetermined size subregion are encoded by outputting bits of said corresponding bit sequence beginning with the respective significant bitplane.

35. The computer program product according to claim 34, wherein only bits of said corresponding bit sequence above said predetermined minimum bitplane are output in said coded representation.

36. The computer program product according to claim 26, wherein said control means controls said scanning and partitioning means to repetitively function until each bitplane of said selected region has been scanned.

37. The computer program product according to claim 36, wherein each bitplane of said selected region above said minimum bitplane has been scanned.

38. The computer program product according to claim 26, wherein said computer program product is implemented using a general-purpose computer.

39. The computer program product according to claim 38, wherein said computer program product includes a set of instructions executable on said computer, wherein said set of instructions includes modules for implementing said transforming means, said selecting means, said scanning means, said partitioning means, and said controlling means.

40. A method for decoding a coded representation of a digital image, said method including the steps of:
  selecting a region of coefficients of said coded representation of said digital image, said coded representation including a first token for each insignificant bitplane of said coefficients, a second token for each significant bitplane of said coefficients, and zero or more coded coefficients;
  (a) scanning said coded representation of said selected region;
  (b) if a first token is determined, providing an insignificant bitplane in an output stream for a current bitplane of coefficients of said selected region;
  (c) if a second token is determined, providing a significant bitplane in said output stream for said current bitplane of said coefficients of said selected region and performing at least octave partitioning on said selected region to form two or more subregions, and setting each of said subregions as said selected region; and
  (d) repeating steps (a) to (c) commencing from a predetermined bitplane until a predetermined minimum bitplane has been reached, or until said selected region has a predetermined size wherein a coded coefficient of said selected region is decoded and provided in said output stream.

41. The method according to claim 40, further comprising the step of inverse transforming decoded coefficients of said output stream to provide said digital image.

42. The method according to claim 41, wherein said inverse transforming step includes the step of applying an inverse discrete wavelet transform to said decoded coefficients.

43. The method according to claim 40, wherein said predetermined size is less than or equal to 2×2 coefficients.

44. The method according to claim 40, wherein each coefficient is to be represented by a predefined bit sequence, and said predetermined size coded coefficients are decoded by outputting bits of said corresponding bit sequence beginning with the respective significant bitplane.

45. The method according to claim 44, wherein only bits of said corresponding bit sequence above said predetermined minimum bitplane are output in said output stream.

46. The method according to claim 40, wherein, in step (d), steps (a) to (c) are repeated otherwise until each bitplane of said selected region has been scanned.

47. The method according to claim 40, wherein said scanning step is performed from a most significant bitplane towards a least significant bitplane, and said predetermined bitplane is said significant bitplane.

48. An apparatus for decoding a coded representation of a digital image, said apparatus including:
  means for selecting a region of coefficients of said coded representation of said digital image, said coded representation including a first token for each insignificant bitplane of said coefficients, a second token for each significant bitplane of said coefficients, and zero or more coded coefficients;
  means for scanning said coded representation of said selected region;
  means for, if a first token is determined, providing an insignificant bitplane in an output stream for a current bitplane of coefficients of said selected region;
  means for, if a second token is determined, providing a significant bitplane in said output stream for said current bitplane of said coefficients of said selected region and performing at least octave partitioning on said selected region to form two or more subregions, and setting each of said subregions as said selected region; and
  means for controlling said scanning means, said means for providing said insignificant bitplane, and means for providing said significant bitplane commencing from a predetermined bitplane until a predetermined minimum bitplane has been reached, or until said selected region has a predetermined size wherein a coded coefficient of said selected region is decoded and provided in said output stream.

49. The apparatus according to claim 48, further comprising means for inverse transforming decoded coefficients of said output stream to provide said digital image.

50. The apparatus according to claim 49, wherein said inverse transforming means includes means for applying an inverse discrete wavelet transform to said decoded coefficients.

51. The apparatus according to claim 48, wherein said predetermined size is less than or equal to 2×2 coefficients.

52. The apparatus according to claim 48, wherein each coefficient is to be represented by a predefined bit sequence, and said predetermined size coded coefficients are decoded by outputting bits of said corresponding bit sequence beginning with the respective significant bitplane.

53. The apparatus according to claim 52, wherein only bits of said corresponding bit sequence above said predetermined minimum bitplane are output in said output stream.

54. The apparatus according to claim 48, wherein said controlling means controls said scanning means, said means for providing said insignificant bitplane, and means for providing said significant bitplane to repetitively function until each bitplane of said selected region has been scanned.

55. The apparatus according to claim 48, wherein said apparatus is implemented using a general-purpose digital computer.

56. The apparatus according to claim 48, wherein said scanning means scans from a most significant bitplane towards a least significant bitplane, and said predetermined bitplane is said significant bitplane.

57. A computer program product including a computer readable medium having recorded thereon a computer program for decoding a coded representation of a digital image, said computer program product comprising:
- means for selecting a region of coefficients of said coded representation of said digital image, said coded representation including a first token for each insignificant bitplane of said coefficients, a second token for each significant bitplane of said coefficients, and zero or more coded coefficients;
- means for scanning said coded representation of said selected region;
- means for, if a first token is determined, providing an insignificant bitplane in an output stream for a current bitplane of coefficients of said selected region;
- means for, if a second token is determined, providing a significant bitplane in said output stream for said current bitplane of said coefficients of said selected region and performing at least octave partitioning on said selected region to form two or more subregions, and setting each of said subregions as said selected region; and
- means for controlling said scanning means, said means for providing said insignificant bitplane, and said means for providing said significant bitplane commencing from a predetermined bitplane until a predetermined minimum bitplane has been reached, or until said selected region has a predetermined size wherein a coded coefficient of said selected region is decoded and provided in said output stream.

58. The computer program product according to claim 57, further comprising means for inverse transforming decoded coefficients of said output stream to provide said digital image.

59. The computer program product according to claim 57, wherein said inverse transforming means includes means for applying an inverse discrete wavelet transform to said decoded coefficients.

60. The computer program product according to claim 57, wherein said predetermined size is less than or equal to 2×2 coefficients.

61. The computer program product according to claim 57, wherein each coefficient is to be represented by a predefined bit sequence, and said predetermined size coded coefficients are decoded by outputting bits of said corresponding bit sequence beginning with the respective significant bitplane.

62. The computer program product according to claim 61, wherein only bits of said corresponding bit sequence above said predetermined minimum bitplane are output in said output stream.

63. The computer program product according to claim 57, wherein said controlling means controls said scanning means, said means for providing said insignificant bitplane, and means for providing said significant bitplane to repetitively function until each bitplane of said selected region has been scanned.

64. The computer program product according to claims 57, wherein said computer program product is implemented using a general-purpose digital computer.

65. The computer program product according to claim 64, wherein said computer program product includes a set of instructions executable on said computer, wherein said set of instructions includes modules for implementing said selecting means, said scanning means, said means for providing said insignificant bitplane, said means for providing said significant bitplane, and said controlling means.

66. The computer program product according to claim 57, wherein said scanning means scans from a most significant bitplane towards a least significant bitplane, and said predetermined bitplane is said significant bitplane.

67. A method of encoding a digital image, said method including the steps of:
- decomposing said image using a subband transform to provide a number of subbands;
- for each subband, selecting said subband as an initial region, wherein said region is represented by a plurality of coefficients, each coefficient being represented by a predefined bit sequence, wherein each bit of said bit sequence has a defined bit level representing a position of said bit in said bit sequence, and for each subband, performing the following sub-steps;
  - (a) checking if a current bit level of the selected region is significant;
  - (b) if said current bit level is significant, outputting a first token in a coded representation and performing at least octave partitioning on said selected region to form a number of sub-regions, wherein each sub-region is processed as said selected region in turn;
  - (c) if said current bit level is insignificant, outputting a second token in said coded representation and selecting the next lower bit level of said selected region as said current bit level; and
  - (d) repeating steps (a) to (e) until said current bit level is less than a specified minimum bit level, or said selected region has a predetermined size wherein coefficients of said selected region are coded in said coded representation.

68. The method according to claim 67, wherein said coefficients of said selected region are coded by representing each coefficient by the bits between the corresponding current bit level and the minimum bit level.

69. The method according to claim 67, wherein said subband transform includes a discrete wavelet transform.

70. An apparatus for encoding a digital image, said apparatus including:
- means for decomposing said image using a subband transform to provide a number of subbands;
- means for, for each subband, selecting said subband as an initial region, wherein said region is represented by a plurality of coefficients, each coefficient being represented by a predefined bit sequence, wherein each bit of said bit sequence has a defined bit level representing a position of said bit in said bit sequence, and including the following:
  - means for checking if a current bit level of the selected region is significant;
  - means for, if said current bit level is significant, outputting a first token in a coded representation and performing at least octave partitioning on said selected region to form a number of sub-regions, wherein each sub-region is processed as said selected region in turn;
  - means for, if said current bit level is insignificant, outputting a second token in said coded representation and selecting the next lower bit level of said selected region as said current bit level; and means for controlling said checking means, said means for outputting said first token, and said means for outputting said second token to carry out respective functioning of said checking means, said means for outputting said first token, and said means for outputting said second token until said current bit level is less than a specified minimum bit level, or said selected region has a predetermined size wherein coefficients of said selected region are coded in said coded representation.

71. The apparatus according to claim 70, wherein said coefficients of said selected region are coded by representing each coefficient by the bits between the corresponding current bit level and the minimum bit level.

72. The apparatus according to claim 70, wherein said subband transform includes a discrete wavelet transform.

73. A computer program product including a computer readable medium having recorded thereon a computer program for encoding a digital image, said computer program product including:

means for decomposing said image using a subband transform to provide a number of subbands;

means for, for each subband, selecting said subband as an initial region, wherein said region is represented by a plurality of coefficients, each coefficient being represented by a predefined bit sequence, wherein each bit of said bit sequence has a defined bit level representing a position of said bit in said bit sequence, and including the following:

means for checking if a current bit level of the selected region is significant;

means for, if said current bit level is significant, outputting a first token in a coded representation and performing at least octave partitioning on said selected region to form a number of sized sub-regions, wherein each sub-region is processed as said selected region in turn;

means for, if said current bit level is insignificant, outputting a second token in said coded representation and selecting the next lower bit level of said selected region as said current bit level; and means for controlling said checking means, said means for outputting said first token, and said means for outputting said second token to carry out respective functioning of said checking means, said means for outputting said first token, and said means for outputting said second token until said current bit level is less than a specified minimum bit level, or said selected region has a predetermined size wherein coefficients of said selected region are coded in said coded representation.

74. The computer program product according to claim 73, wherein said coefficients of said selected region are coded by representing each coefficient by the bits between the corresponding current bit level and the minimum bit level.

75. The computer program product according to claim 73, wherein said subband transform includes a discrete wavelet transform.

76. A method of decoding a coded representation of a digital image, said method including the steps of:

for each region of said coded representation corresponding to a subband, selecting a region of coefficients of said coded representation as an initial region, said coded representation containing a first token for each significant bit level, a second token for each insignificant bit level, and zero or more coded coefficients, each region comprising at least one coefficient, wherein each coefficient is represented by a predefined bit sequence, each bit of said bit sequence having a defined bit level representing a position of said bit in said bit sequence, and for each region, performing the following sub-steps:

(a) checking a current bit level of said selected region of said coded representation for a token;

(b) if said current bit level has a first token, outputting a significant bit level and performing at least octave partitioning on said selected region to form a number of sub-regions, wherein each sub-region is processed as said selected region in turn;

(c) if said current bit level has a second token, outputting an insignificant bit level and selecting the next lower bit level of said selected region as said current bit level; and (d) repeating steps (a) to (e) until said current bit level is less than a specified minimum bit level, or said selected region has a predetermined size wherein at least one coded coefficient of said selected region is decoded for providing a subband for said selected region.

77. The method according to claim 76, further comprising the step of inverse decomposing said decoded subbands using an inverse subband transform to provide said digital image.

78. The method according to claim 76, wherein said coded coefficients are represented by the bits between said corresponding current bit level and said specified minimum bit level.

79. The method according to claim 77, wherein said inverse subband transform includes an inverse discrete wavelet transform.

80. An apparatus for decoding a coded representation of a digital image, said apparatus including:

means for, for each region of said coded representation corresponding to a subband, selecting a region of coefficients of said coded representation as an initial region, said coded representation containing a first token for each significant bit level, a second token for each insignificant bit level, and zero or more coded coefficients, each region comprising at least one coefficient, wherein each coefficient is represented by a predefined bit sequence, each bit of said bit sequence having a defined bit level representing a position of said bit in said bit sequence, and further including:

means for checking a current bit level of said selected region of said coded representation for a token;

means for, if said current bit level has a first token, outputting a significant bit level and performing at least octave partitioning on said selected region to form a number of sub-regions, wherein each sub-region is processed as said selected region in turn;

means for, if said current bit level has a second token, outputting an insignificant bit level and selecting the next lower bit level of said selected region as said current bit level; and means for controlling repeated functioning of said checking means, said partitioning means, and said means for selecting the next lower bit level until said current bit level is less than a specified minimum bit level, or said selected region has a predetermined size wherein at least one coded coefficient of said selected region is decoded for providing a subband for said selected region.

81. The apparatus according to claim 80, further comprising the step of inverse decomposing said decoded subbands using an inverse subband transform to provide said digital image.

82. The apparatus according to claim 80, wherein said coded coefficients are represented by the bits between said corresponding current bit level and said specified minimum bit level.

83. The apparatus according to claim 81, wherein said inverse subband transform includes an inverse discrete wavelet transform.

84. A computer program product including a computer readable medium having recorded thereon a computer program for decoding a coded representation of a digital image, said computer program product including:
　means for, for each region of said coded representation corresponding to a subband, selecting a region of coefficients of said coded representation as an initial region, said coded representation containing a first token for each significant bit level, a second token for each insignificant bit level, and zero or more coded coefficients, each region comprising at least one coefficient, wherein each coefficient is represented by a predefined bit sequence, each bit of said bit sequence having a defined bit level representing a position of said bit in said bit sequence, and further including:
　　means for checking a current bit level of said selected region of said coded representation for a token;
　　means for, if said current bit level has a first token, outputting a significant bit level and performing at least octave partitioning on said selected region to form a number of sub-regions, wherein each sub-region is processed as said selected region in turn;
　　means for, if said current bit level has a second token, outputting an insignificant bit level and selecting the next lower bit level of said selected region as said current bit level; and
　　means for controlling repeated functioning of said checking means, said partitioning means, and said means for selecting the next lower bit level until said current bit level is less than a specified minimum bit level, or said selected region has a predetermined size wherein at least one coded coefficient of said selected region is decoded for providing a subband for said selected region.

85. The computer program product according to claim 84, further comprising means for inverse decomposing said decoded subbands using an inverse subband transform to provide said digital image.

86. The computer program product according to claim 84, wherein said coded coefficients are represented by the bits between said corresponding current bit level and said specified minimum bit level.

87. The computer program product according to claim 85, wherein said inverse subband transform includes an inverse discrete wavelet transform.

88. A method of encoding a digital image, said method including the steps of
　a) applying a subband transform to said digital image to provide a plurality of AC subband regions, at one or more resolutions, and a DC subband region for each block, wherein each said subband region is represented by a plurality of coefficients, each coefficient being represented by a predefined bit sequence, and wherein each bit of said bit sequence has a defined bitplane representing a position of said bit in said bit sequence;
　b) selecting said DC subband region as a selected region and performing the following sub-steps:
　　ba) checking if a current bitplane of the selected region is significant;
　　bb) if said current bitplane is significant, outputting a first token in a coded representation and performing at least octave partitioning on said selected region to form a number of sub-regions, wherein each sub-region is processed as the selected region in turn;
　　bc) if said current bitplane is insignificant, outputting a second token in the coded representation and selecting the next lower bitplane of the selected region as the current bitplane;
　　bd) repeating sub-steps ba) to bc) until said current bitplane is less than a specified minimum bitplane, or said selected region has a predetermined size and coefficients of said selected region are coded in said coded representation;
　c) selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;
　d) setting one or more AC subband regions, of a current resolution level, as a selected region and performing the sub-steps ba) to bd);
　e) repeating step d) until substantially all AC subbands of the current resolution level have been encoded; and
　f) repeating steps c) to e) until all AC subbands of each block have been encoded.

89. The method according to claim 88, further including the step of dividing the digital image into a plurality of blocks, said blocks being subband transformed to provide said plurality of AC subband regions and said DC subband region.

90. The method according to claim 88, further including the step of dividing subband transform coefficients of said digital image into a plurality of blocks to provide said plurality of AC subband regions and said DC subband region.

91. An apparatus for encoding a digital image, said apparatus including:
　means for applying a subband transform to said digital image to provide a plurality of AC subband regions, at one or more resolutions, and a DC subband region for each block, wherein each said subband region is represented by a plurality of coefficients, each coefficient being represented by a predefined bit sequence, and wherein each bit of said bit sequence has a defined bitplane representing a position of said bit in said bit sequence;
　means for selecting said DC subband region as a selected region, and further including:
　　means for checking if a current bitplane of the selected region is significant;
　　means for, if said current bitplane is significant, outputting a first token in a coded representation and performing at least octave partitioning on said selected region to form a number of sub-regions, wherein each sub-region is processed as the selected region in turn;
　　means for, if said current bitplane is insignificant, outputting a second token in the coded representation and selecting the next lower bitplane of the selected region as the current bitplane;
　　means for controlling repeated operation of said checking means, said first token outputting means, and said second token outputting means until said current bitplane is less than a specified minimum bitplane, or said selected region has a predetermined size and coefficients of said selected region are coded in said coded representation;

means for selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;

means for setting one or more AC subband regions, of a current resolution level, as a selected region and further including:

means for checking if a current bitplane of the selected region is significant;

means for, if said current bitplane is significant, outputting said first token in a coded representation and partitioning said selected region into a number of sub-regions, wherein each sub-region is processed as the selected region in turn;

means for, if said current bitplane is insignificant, outputting said second token in the coded representation and selecting the next lower bitplane of the selected region as the current bitplane;

means for controlling repeated operation of said checking means, said first token outputting means, and said second token outputting means until said current bitplane is less than a specified minimum bitplane, or said selected region has a predetermined size and coefficients of said selected region are coded in said coded representation;

means for controlling repeated operation of said AC-subband-region setting means until substantially all AC subbands of the current resolution level have been encoded; and means for controlling repeated operation of said uncoded-AC-subband-regions selecting means, said AC-subband-region setting means, and said means for controlling said AC-subband-region setting means until all AC subbands of each block have been encoded.

92. The apparatus according to claim 91, further including:

means for dividing the digital image into a plurality of blocks; and means of subband transforming said blocks to provide said plurality of AC subband regions and said DC subband region.

93. The apparatus according to claim 91, further including:

means for subband transforming said blocks to provide said plurality of AC subband regions and said DC subband region; and means for dividing subband transform coefficients into a plurality of blocks to provide said plurality of AC subband regions and said DC subband region.

94. A computer program product including a computer readable medium having recorded thereon a computer program for encoding a digital image, said computer program product including:

means for applying a subband transform to said digital image to provide a plurality of AC subband regions, at one or more resolutions, and a DC subband region for each block, wherein each said subband region is represented by a plurality of coefficients, each coefficient being represented by a predefined bit sequence, and wherein each bit of said bit sequence has a defined bitplane representing a position of said bit in said bit sequence;

means for selecting said DC subband region as a selected region, and further including:

means for checking if a current bitplane of the selected region is significant;

means for, if said current bitplane is significant, outputting a first token in a coded representation and performing at least octave partitioning on said selected region to form a number of sub-regions, wherein each sub-region is processed as the selected region in turn;

means for, if said current bitplane is insignificant, outputting a second token in the coded representation and selecting the next lower bitplane of the selected region as the current bitplane;

means for controlling repeated operation of said checking means, said first token outputting means, and said second taken outputting means until said current bitplane is less than a specified minimum bitplane, or said selected region has a predetermined size and coefficients of said selected region are coded in said coded representation;

means for selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;

means for setting one or more AC subband regions, of a current resolution level, as a selected region and further including:

means for checking if a current bitplane of the selected region is significant;

means for, if said current bitplane is significant, outputting said first token in a coded representation and partitioning said selected region into a number of sub-regions, wherein each sub-region is processed as the selected region in turn;

means for, if said current bitplane is insignificant, outputting said second token in the coded representation and selecting the next lower bitplane of the selected region as the current bitplane;

means for controlling repeated operation of said checking means, said first token outputting means, and said second token outputting means until said current bitplane is less than a specified minimum bitplane, or said selected region has a predetermined size and coefficients of said selected region are coded in said coded representation;

means for controlling repeated operation of said AC-subband-region setting means until substantially all AC subbands of the current resolution level have been encoded; and means for controlling repeated operation of said uncoded-AC-subband-regions selecting means, said AC-subband-region setting means, and said means for controlling said AC-subband-region setting means until all AC subbands of each block have been encoded.

95. The apparatus according to claim 94, further including:

means for dividing the digital image into a plurality of blocks; and means for subband transforming said blocks to provide said plurality of AC subband regions and said DC subband region.

96. The apparatus according to claim 94, further including:
means for subband transforming said blocks to provide said plurality of AC subband regions and said DC subband region; and
means for dividing subband transform coefficients into a plurality of blocks to provide said plurality of AC subband regions and said DC subband region.

97. A method of decoding a coded representation of a digital image, said method including the steps of:
a) selecting a region of said coded representation corresponding to said DC subband region as a selected region, wherein each said subband region is represented by a plurality of coefficients, each coefficient being represented by a predefined bit sequence, and wherein each bit of said bit sequence has a defined bitplane representing a position of said bit in said bit sequence, and performing the following sub-steps:
aa) checking if a current bitplane of the selected region contains a first or second token;
ab) if a first token is found in step aa), outputting a significant bitplane and performing at least octave partitioning on said selected region to form a number of sub-regions, wherein each sub-region is processed as the selected region in turn;
ac) if a second token is found in step aa), outputting an insignificant bitplane and selecting the next lower bitplane of the selected region as the current bitplane;
ad) repeating sub-steps aa) to ac) until said current bitplane is less than a specified minimum bitplane, or said selected region has a predetermined size and coded coefficients of said selected region are decoded;
b) selecting a remaining region of said coded representation corresponding to substantially all uncoded AC subband regions and checking each bitplane of the remaining region of each block from a most significant bitplane towards a least significant bitplane for a first or second token, and outputting an insignificant bitplane for each second token until a first token is determined;
c) outputting a significant bitplane for said first token and setting one or more regions of said coded representation corresponding to AC subband regions, of a current resolution level, as a selected region and performing the sub-steps aa) to ad);
d) repeating step c) until substantially all regions of said coded representation corresponding to AC subbands of the current resolution level have been decoded; and
e) repeating steps b) to d) until all regions of said coded representation corresponding to AC subbands of each block have been decoded.

98. The method according to claim 97, further including the step of applying an inverse subband transform to said plurality of decoded AC subband regions, at one or more resolutions, and said decoded DC subband region for each block to provide said digital image.

99. An apparatus for decoding a coded representation of a digital image, said apparatus including:
means for selecting a region of said coded representation corresponding to said DC subband region as a selected region, wherein each said subband region is represented by a plurality of coefficients, each coefficient being represented by a predefined bit sequence, and wherein each bit of said bit sequence has a defined bitplane representing a position of said bit in said bit sequence, said selecting means further including:
means for checking if a current bitplane of the selected region contains a first or second token;
means for, if a first token is found, outputting a significant bitplane and performing at least octave partitioning on said selected region to form a number of sub-regions, wherein each sub-region is processed as the selected region in turn;
means for, if a second token is found, outputting an insignificant bitplane and selecting the next lower bitplane of the selected region as the current bitplane;
means for controlling repeated operation of said checking means, said significant-bitplane outputting means, and said insignificant-bitplane outputting means until said current bitplane is less than a specified minimum bitplane, or said selected region has a predetermined size and coded coefficients of said selected region are decoded;
means for selecting a remaining region of said coded representation corresponding to substantially all uncoded AC subband regions and checking each bitplane of the remaining region of each block from a most significant bitplane towards a least significant bitplane for a first or second token, and outputting an insignificant bitplane for each second token until a first token is determined;
means for outputting a significant bitplane and setting one or more regions of said coded representation corresponding to AC subband regions, of a current resolution level, as a selected region, said outputting and setting means further including:
means for checking if a current bitplane of the selected region contains a first or second token;
means for, if a first token is found, outputting a significant bitplane and partitioning said selected region into a number of sub-regions, wherein each sub-region is processed as the selected region in turn;
means for, if a second token is found, outputting an insignificant bitplane and selecting the next lower bitplane of the selected region as the current bitplane;
means for controlling repeated operation of said checking means, said significant-bitplane outputting means, and said insignificant-bitplane outputting means until said current bitplane is less than a specified minimum bitplane, or said selected region has a predetermined size and coded coefficients of said selected region are decoded;
means for controlling repeated operation of said setting and outputting means until substantially all regions of said coded representation corresponding to AC subbands of the current resolution level have been decoded; and
means for controlling repeated operation of said means for selecting a remaining region of said coded representation corresponding to substantially all uncoded AC subband regions,
said means for outputting a significant bitplane and setting one or more regions of said coded representation corresponding to AC subband regions, and
means for controlling repeated operation of said setting and outputting means until all regions of said coded representation corresponding to said AC subbands of each block have been decoded.

100. The apparatus according to claim 99, further including means for applying an inverse subband transform to said plurality of decoded AC subband regions, at one or more resolutions, and said decoded DC subband region for each block to provide said digital image.

101. A computer program product including a computer readable medium having recorded thereon a computer program for decoding a coded representation of a digital image, said computer program product including:

means for selecting a region of said coded representation corresponding to said DC subband region as a selected region, wherein each said subband region is represented by a plurality of coefficients, each coefficient being represented by a predefined bit sequence, and wherein each bit of said bit sequence has a defined bitplane representing a position of said bit in said bit sequence, said selecting means further including:

means for checking if a current bitplane of the selected region contains a first or second token;

means for, if a first token is found, outputting a significant bitplane and performing at least octave partitioning on said selected region to form a number of sub-regions, wherein each sub-region is processed as the selected region in turn;

means for, if a second token is found, outputting an insignificant bitplane and selecting the next lower bitplane of the selected region as the current bitplane;

means for controlling repeated operation of said checking means, said significant-bitplane outputting means, and said insignificant-bitplane outputting means until said current bitplane is less than a specified minimum bitplane, or said selected region has a predetermined size and coded coefficients of said selected region are decoded;

means for selecting a remaining region of said coded representation corresponding to substantially all uncoded AC subband regions and checking each bitplane of the remaining region of each block from a most significant bitplane towards a least significant bitplane for a first or second token, and outputting an insignificant bitplane for each second token until a first token is determined;

means for outputting a significant bitplane and setting one or more regions of said coded representation corresponding to AC subband regions, of a current resolution level, as a selected region, said outputting and setting means further including:

means for checking if a current bitplane of the selected region contains a first or second token;

means for, if a first token is found, outputting a significant bitplane and partitioning said selected region in to a number of sub-regions, wherein each sub-region is processed as the selected region in turn;

means for, if a second token is found, outputting an insignificant bitplane and selecting the next lower bitplane of the selected region as the current bitplane;

means for controlling repeated operation of said checking means, said significant-bitplane outputting means, and said insignificant-bitplane outputting means until said current bitplane is less than a specified minimum bitplane, or said selected region has a predetermined size and coded coefficients of said selected region are decoded;

means for controlling repeated operation of said setting and outputting means until substantially all regions of said coded representation corresponding to AC subbands of the current resolution level have been decoded; and means for controlling repeated operation of said means for selecting a remaining region of said coded representation corresponding to substantially all uncoded AC subband regions, said means for outputting a significant bitplane and setting one or more regions of said coded representation corresponding to AC subband regions, and means for controlling repeated operation of said setting and outputting means until all regions of said coded representation corresponding to said AC subbands of each block have been decoded.

102. The apparatus according to claim 101, further including means for applying an inverse subband transform to said plurality of decoded AC subband regions, at one or more resolutions, and said decoded DC subband region for each block to provide said digital image.

103. A method according to claim 1, wherein said octave partitioning comprises the step of dividing said selected region into at least a first and second subregion wherein said first subregion includes a portion of the coefficients forming said selected region and said second subregion includes a remaining portion of the coefficients of said selected region.

104. A method according to claim 40, wherein said octave partitioning comprises the step of dividing said selected region into at least a first and second subregion wherein said first subregion includes a portion of the coefficients forming said selected region and said second subregion includes a remaining portion of the coefficients of said selected region.

105. A method according to claim 67, wherein said octave partitioning comprises the step of dividing said selected region into at least a first and second subregion wherein said first subregion includes a portion of the coefficients forming said selected region and said second subregion includes a remaining portion of the coefficients of said selected region.

106. A method according to claim 76, wherein said octave partitioning comprises the step of dividing said selected region into at least a first and second subregion wherein said first subregion includes a portion of the coefficients forming said selected region and said second subregion includes a remaining portion of the coefficients of said selected region.

107. A method according to claim 88, wherein said octave partitioning comprises the step of dividing said selected region into at least a first and second subregion wherein said first subregion includes a portion of the coefficients forming said selected region and said second subregion includes a remaining portion of the coefficients of said selected region.

108. A method according to claim 97, wherein said octave partitioning comprises the step of dividing said selected region into at least a first and second subregion wherein said first subregion includes a portion of the coefficients forming said selected region and said second subregion includes a remaining portion of the coefficients of said selected region.

* * * * *